(12) United States Patent
Nahum et al.

(10) Patent No.: US 10,819,664 B2
(45) Date of Patent: Oct. 27, 2020

(54) CHAT-BASED APPLICATION INTERFACE FOR AUTOMATION

(71) Applicant: WalkMe LTD., Tel Aviv (IL)

(72) Inventors: Nir Nahum, Tel Aviv (IL); Shlomi Sasson, Givat Zeev (IL)

(73) Assignee: WALKME LTD., Tel Aviv (IL)

( * ) Notice: Subject to any disclaimer, the term of this patent is extended or adjusted under 35 U.S.C. 154(b) by 0 days.

(21) Appl. No.: 16/358,467

(22) Filed: Mar. 19, 2019

(65) Prior Publication Data
US 2019/0215283 A1 Jul. 11, 2019

Related U.S. Application Data

(63) Continuation of application No. PCT/IL2018/051168, filed on Nov. 4, 2018.

(60) Provisional application No. 62/581,714, filed on Nov. 5, 2017.

(51) Int. Cl.
| | |
|---|---|
| G06F 3/048 | (2013.01) |
| H04L 12/58 | (2006.01) |
| G06F 3/16 | (2006.01) |
| G06F 40/35 | (2020.01) |
| G06F 40/134 | (2020.01) |
| G06F 3/0482 | (2013.01) |
| G06F 3/0483 | (2013.01) |
| G06F 9/54 | (2006.01) |

(52) U.S. Cl.
CPC ............ *H04L 51/02* (2013.01); *G06F 3/0482* (2013.01); *G06F 3/0483* (2013.01); *G06F 3/16* (2013.01); *G06F 3/167* (2013.01); *G06F 9/542* (2013.01); *G06F 40/134* (2020.01); *G06F 40/35* (2020.01)

(58) Field of Classification Search
CPC ........ G06F 3/0482; G06F 3/0483; G06F 3/16; G06F 3/167; G06F 9/542; G06F 17/2235; G06F 17/279; G06F 40/10
See application file for complete search history.

(56) References Cited

U.S. PATENT DOCUMENTS

| | | | | |
|---|---|---|---|---|
| 9,509,799 | B1 * | 11/2016 | Cronin | ................... H04L 67/32 |
| 10,749,823 | B1 * | 8/2020 | Popa | ..................... G06F 40/295 |
| 2003/0058369 | A1 * | 3/2003 | Takechi | ............. H04L 12/2805 |
| | | | | 348/734 |

(Continued)

OTHER PUBLICATIONS

ISR for PCT/IL2018/051168, dated Jan. 31, 2019.

*Primary Examiner* — Mahelet Shiberou

(57) ABSTRACT

A method, apparatus and product for chat-based application interface for automation. Using a natural language interface, receiving user input. Based on the user input, determining an automation process of a computer program having a user interface (UI), to be executed. The automation process is executed by utilizing the UI to input data thereto or execute functionality thereof. Additionally or alternatively, a conversation to be implemented by a natural language interface may be defined. The conversation is configured to obtain from the user one or more values corresponding to one or more parameters. The conversation is associated with a parameterized automation process depending on the one or more parameters. The parameterized automation process is invoked automatically by a natural language interface and using one or more values provided by the user to the natural language interface for the one or more parameters.

33 Claims, 14 Drawing Sheets

(56) References Cited

U.S. PATENT DOCUMENTS

| | | | |
|---|---|---|---|
| 2005/0210061 A1* | 9/2005 | Chang | G06F 16/243 |
| 2006/0129379 A1* | 6/2006 | Ramsey | G06F 3/038 |
| | | | 704/9 |
| 2007/0172063 A1* | 7/2007 | Biggs | H04L 51/04 |
| | | | 380/255 |
| 2012/0016678 A1* | 1/2012 | Gruber | G10L 15/22 |
| | | | 704/275 |
| 2012/0265528 A1* | 10/2012 | Gruber | G10L 15/18 |
| | | | 704/235 |
| 2014/0115456 A1* | 4/2014 | White | G10L 15/22 |
| | | | 715/708 |
| 2014/0249830 A1* | 9/2014 | Gallopyn | G06F 19/00 |
| | | | 705/2 |
| 2016/0094492 A1 | 3/2016 | Li et al. | |
| 2016/0300570 A1 | 10/2016 | Gustafson et al. | |
| 2016/0352658 A1 | 12/2016 | Capper et al. | |
| 2017/0289071 A1 | 10/2017 | Roberts et al. | |
| 2017/0293610 A1* | 10/2017 | Tran | G06F 16/90332 |
| 2018/0137178 A1* | 5/2018 | Corbett | G06F 3/0482 |
| 2018/0183735 A1* | 6/2018 | Naydonov | G06N 3/006 |
| 2018/0349556 A1* | 12/2018 | Owen | G06F 40/174 |
| 2019/0043106 A1* | 2/2019 | Talmor | G06N 3/006 |
| 2019/0068527 A1* | 2/2019 | Chen | G06Q 10/00 |
| 2019/0103111 A1* | 4/2019 | Tiwari | G06F 16/3334 |
| 2019/0138600 A1* | 5/2019 | Krishnan | G06F 8/34 |

\* cited by examiner

← Add New Employee
EMPLOYEE ID

>Bots
>Conversations
>Connections

∨ Question Settings

\* Question Name

| Employee ID | 580 ∨ |

\* Question Type

| Number | 582 ∨ |

\* Question Text

| What would be the employee ID? (Please use numbers) 584 |

Suggestions

| 586 |

Accept Suggests Only

588 ─ ⚪

\* Error Message

| I'm sorry I didn't understand, let's try again. |

\* Delay

| 0 | Milliseconds

590 ─ [ UPDATE QUESTION ]

Fig. 5D

CHAT-BASED APPLICATION INTERFACE FOR AUTOMATION

CROSS-REFERENCE TO RELATED APPLICATION

This application is a continuation of PCT application PCT/IL2018/051168, filed on Nov. 4, 2018, which claims the benefit of provisional patent application No. 62/581,714 filed Nov. 5, 2017, which is hereby incorporated by reference in its entirety without giving rise to disavowment.

TECHNICAL FIELD

The present disclosure relates to user interfaces in computerized system in general, and to user-interfaces for automation processes that utilize chat bots, in particular.

BACKGROUND

A Chat bot is a computer program implementing natural language interface to conduct a conversation via auditory or textual methods with the user. Chat bots are typically used in dialog systems for various practical purposes including customer service or information acquisition. Some chatter-bots use sophisticated natural language processing systems, but many simpler systems scan for keywords within the input, then pull a reply with the most matching keywords, or the most similar wording pattern, from a database.

Nowadays, chat bots are starting to appear everywhere. From providing functionality via known communication services, such as FACEBOOK™ TELEGRAM™, or the like, to manipulating Internet of Things (IoT) devices via voice commands, such as using a smart speaker (e.g., GOOGLE HOME™, AMAZON ECHO™, or the like).

Implementing a new functionality via a chat bot may be a complicated task. For example, in the AMAZON ECHO™ ecosystem, developers can develop new "skills" using dedicated Application Programming Interface (API). A new skill for the smart speaker is a cloud-based service that is programmed to handle requests when invoked by the program of the smart speaker.

BRIEF SUMMARY

One exemplary embodiment of the disclosed subject matter is a method comprising: using a natural language interface, receiving input from a user; determining, based on the input from the user, an automation process to be executed, wherein the automation process is an automation process of a computer program having a user interface; and executing the automation process, wherein said executing comprises utilizing the user interface of the computer program to input data thereto or execute functionality thereof.

Optionally, the natural language interface is a chat bot service operable to converse with the user in natural language.

Optionally, the automation process is a parameterized automation process having a parameter, wherein the chat bot service is configured to prompt the user to provide a value for the parameter, wherein said executing comprises utilizing the value of the parameter.

Optionally, the user interface is a Graphical User Interface (GUI) comprising one or more input fields, wherein said utilizing the user interface comprises inputting data received by the natural language interface to the one or more input fields.

Optionally, the user interface is a Graphical User Interface (GUI) comprising one or more interactable GUI elements, wherein said utilizing the user interface comprises performing interface interaction with the one or more interactable GUI elements.

Optionally, said executing is performed without utilizing an Application Programming Interface (API) of the computer program.

Optionally, the automation process comprises a sequence of steps, wherein each step is selected from a group consisting of: a page redirect step; a click element step; a hovering over element step; a set focus to element step; a select value from list step; a fill input field with value step; a prompt user step; a time-wait step; and a condition-wait step.

Optionally, said determining comprises selecting the automation process from a database retaining a plurality of user-defined automation processes; wherein the database is updatable by one or more users via a Graphical User Interface (GUI) capable of defining new automation processes and updating existing automation processes retained therein.

Optionally, the automation process defines an operation to be performed with respect to an element in the user interface, wherein the automation process identifies the element based on a plurality of parameters of the element; wherein said executing the automation process comprises identifying the element in the user interface, wherein said identifying the element comprises computing a similarity score for each element in the user interface using the plurality of parameters of the element, and selecting a selected element having a highest similarity score, wherein the highest similarity score is at least above a predetermined threshold.

Optionally, the computer program is one of: a web-based application, a native mobile application, or a desktop program.

Optionally, the method comprises: generating a link, wherein the link is configured to cause said executing upon clicking thereon, wherein the natural language interface provides the link to the user.

Optionally, the link comprises a conversation identifier of a conversation session between the user and the natural language interface, wherein the natural language interface is configured to store one or more values of parameters obtained from the user during the conversation in a database in a manner associated with the conversation identifier, wherein said executing comprises retrieving, using the conversation identifier passed by the link, the one or more values of parameters from the database, wherein said utilizing the user interface is performed using the one or more values of the parameters.

Optionally, said executing is performed on a client device of the user.

Optionally, the natural language interface is a voice-based service, wherein the voice-based service is configured to receive vocal commands from a human user.

Another exemplary embodiment of the disclosed subject matter is a method for defining an automation process to be invoked in response to a conversation of a user with a natural language interface, the method comprising: defining a conversation to be implemented by a natural language interface, wherein the conversation is configured to obtain from the user one or more values to one or more parameters; associating the conversation with the automation process, wherein the automation process is configured to utilize a user interface of a computer program to input data thereto or execute functionality thereof, wherein the automation process is a parameterized automation process depending on the one or more parameters; and publishing the conversation to be accessible to a user via the natural language interface, wherein the user is enabled to interact with the natural language interface in accordance with the conversation, whereby the parameterized automation process is invoked automatically by the natural language interface and using one or more values provided by the user to the natural language interface for the one or more parameters.

Optionally, said defining comprises determining a conversation flow, wherein the conversation flow defines an order between conversation elements, wherein the conversation elements comprise at least a question element and an action element, wherein the action element is associated with automation process.

Optionally, the conversation elements comprise at least one of: a message element and a condition element.

Optionally, the conversation elements comprise a second action element associated with a second automation process, whereby the natural language interface is configured to selectively invoke either the automation process or the second automation process based on interaction with the user.

Optionally, the natural language interface is associated with a plurality of conversations, wherein the plurality of conversations comprise the conversation; wherein each of the plurality of conversations is associated with one or more terms, wherein the natural language interface is configured to select a conversation from the plurality of conversations based on a user intent matching the one or more terms, wherein the user intent is determined based on interaction of the user with the natural language interface.

Optionally, the natural language interface is implemented by a third-party messaging service, wherein the natural language interface is configured to generate and provide the user with a link, wherein interaction with the link is configured to cause execution of the automation process.

Optionally, the link comprises a conversation identifier of a conversation between the user and the natural language interface, wherein the one or more values are configured to be stored in a database by the natural language interface and retrieved, using the conversation identifier, by a client device executing the automation process.

Optionally, the link comprises the one or more values, thereby providing the one or more values to the automation process.

Yet another exemplary embodiment of the disclosed subject matter is a computerized apparatus having a processor and coupled memory, the processor being adapted to perform: using a natural language interface, receiving input from a user; determining, based on the input from the user, an automation process to be executed, wherein the automation process is an automation process of a computer program having a user interface; and executing the automation process, wherein said executing comprises utilizing the user interface of the computer program to input data thereto or execute functionality thereof.

Optionally, the automation process is a parameterized automation process having a parameter, wherein the natural language interface is configured to prompt the user to provide a value for the parameter, wherein said executing comprises utilizing the value of the parameter.

Optionally, the user interface is a Graphical User Interface (GUI) comprising one or more input fields, wherein said utilizing the user interface comprises inputting data received by the natural language interface to the one or more input fields.

Optionally, the user interface is a Graphical User Interface (GUI) comprising one or more interactable GUI elements, wherein said utilizing the user interface comprises performing interface interaction with the one or more interactable GUI elements.

Optionally, said executing is performed without utilizing an Application Programming Interface (API) of the computer program.

Optionally, said determining comprises selecting the automation process from a database retaining a plurality of user-defined automation processes; wherein the database is updatable by one or more users via a Graphical User Interface (GUI) capable of defining new automation processes and updating existing automation processes retained therein.

Optionally, the automation process defines an operation to be performed with respect to an element in the user interface, wherein the automation process identifies the element based on a plurality of parameters of the element; wherein said executing the automation process comprises identifying the element in the user interface, wherein said identifying the element comprises computing a similarity score for each element in the user interface using the plurality of parameters of the element, and selecting a selected element having a highest similarity score, wherein the highest similarity score is at least above a predetermined threshold.

Optionally, said processor is further adapted to generate a link, wherein the link is configured to cause said executing upon clicking thereon, wherein the natural language interface provides the link to the user.

Optionally, the link comprises a conversation identifier of a conversation session between the user and the natural language interface, wherein the natural language interface is configured to store one or more values of parameters obtained from the user during the conversation in a database in a manner associated with the conversation identifier, wherein said executing comprises retrieving, using the conversation identifier passed by the link, the one or more values of parameters from the database, wherein said utilizing the user interface is performed using the one or more values of the parameters.

Optionally, said executing is performed on a client device of the user.

Yet another exemplary embodiment of the disclosed subject matter is a computerized apparatus for defining an automation process to be invoked in response to a conversation of a user with a natural language interface, wherein said computerized apparatus comprising a processor and coupled memory, the processor being adapted to perform: defining a conversation to be implemented by a natural language interface, wherein the conversation is configured to obtain from the user one or more values to one or more parameters; associating the conversation with the automation process, wherein the automation process is configured to utilize a user interface of a computer program to input data thereto or execute functionality thereof, wherein the automation process is a parameterized automation process depending on the one or more parameters; and publishing the conversation to be accessible to a user via the natural language interface, wherein the user is enabled to interact with the natural language interface in accordance with the conversation, whereby the parameterized automation process is invoked automatically by the natural language interface and using one or more values provided by the user to the natural language interface for the one or more parameters.

Optionally, said defining comprises determining a conversation flow, wherein the conversation flow defines an order between conversation elements, wherein the conversation elements comprise at least a question element and an action element, wherein the action element is associated with automation process.

Optionally, the conversation elements comprise at least one of: a message element and a condition element.

Optionally, the conversation elements comprise a second action element associated with a second automation process, whereby the natural language interface is configured to selectively invoke either the automation process or the second automation process based on interaction with the user.

Optionally, the natural language interface is associated with a plurality of conversations, wherein the plurality of conversations comprise the conversation; wherein each of the plurality of conversations is associated with one or more terms, wherein the natural language interface is configured to select a conversation from the plurality of conversations based on a user intent matching the one or more terms, wherein the user intent is determined based on interaction of the user with the natural language interface.

Optionally, the natural language interface is implemented by a third-party messaging service, wherein the natural language interface is configured to generate and provide the user with a link, wherein interaction with the link is configured to cause execution of the automation process.

Optionally, the link comprises a conversation identifier of a conversation between the user and the natural language interface, wherein the one or more values are configured to be stored in a database by the natural language interface and retrieved, using the conversation identifier, by a client device executing the automation process.

Optionally, the link comprises the one or more values, thereby providing the one or more values to the automation process.

Yet another exemplary embodiment of the disclosed subject matter is a non-transitory computer readable medium retaining program instructions, which program instructions when read by a processor, cause the processor to perform: using a natural language interface, receiving input from a user; determining, based on the input from the user, an automation process to be executed, wherein the automation process is an automation process of a computer program having a user interface; and executing the automation process, wherein said executing comprises utilizing the user interface of the computer program to input data thereto or execute functionality thereof.

Optionally, the automation process is a parameterized automation process having a parameter, wherein the natural language interface is configured to prompt the user to provide a value for the parameter, wherein said executing comprises utilizing the value of the parameter.

Optionally, the user interface is a Graphical User Interface (GUI) comprising one or more input fields, wherein said utilizing the user interface comprises inputting data received by the natural language interface to the one or more input fields.

Optionally, the user interface is a Graphical User Interface (GUI) comprising one or more interactable GUI elements, wherein said utilizing the user interface comprises performing interface interaction with the one or more interactable GUI elements.

Optionally, said executing is performed without utilizing an Application Programming Interface (API) of the computer program.

Optionally, said determining comprises selecting the automation process from a database retaining a plurality of user-defined automation processes; wherein the database is updatable by one or more users via a Graphical User Interface (GUI) capable of defining new automation processes and updating existing automation processes retained therein.

Optionally, the automation process defines an operation to be performed with respect to an element in the user interface, wherein the automation process identifies the element based on a plurality of parameters of the element; wherein said executing the automation process comprises identifying the element in the user interface, wherein said identifying the element comprises computing a similarity score for each element in the user interface using the plurality of parameters of the element, and selecting a selected element having a highest similarity score, wherein the highest similarity score is at least above a predetermined threshold.

Optionally, the program instructions further cause the processor to generate a link, wherein the link is configured to cause said executing upon clicking thereon, wherein the natural language interface provides the link to the user.

Optionally, the link comprises a conversation identifier of a conversation session between the user and the natural language interface, wherein the natural language interface is configured to store one or more values of parameters obtained from the user during the conversation in a database in a manner associated with the conversation identifier, wherein said executing comprises retrieving, using the conversation identifier passed by the link, the one or more values of parameters from the database, wherein said utilizing the user interface is performed using the one or more values of the parameters.

Optionally, said executing is performed on a client device of the user.

Yet another exemplary embodiment of the disclosed subject matter is a non-transitory computer readable medium for defining an automation process to be invoked in response to a conversation of a user with a natural language interface, the non-transitory computer readable medium retaining program instructions, which program instructions when read by a processor, cause the processor to perform: defining a conversation to be implemented by a natural language interface, wherein the conversation is configured to obtain from the user one or more values to one or more parameters; associating the conversation with the automation process, wherein the automation process is configured to utilize a user interface of a computer program to input data thereto or execute functionality thereof, wherein the automation process is a parameterized automation process depending on the one or more parameters; and publishing the conversation to be accessible to a user via the natural language interface, wherein the user is enabled to interact with the natural language interface in accordance with the conversation, whereby the parameterized automation process is invoked automatically by the natural language interface and using one or more values provided by the user to the natural language interface for the one or more parameters.

Optionally, said defining comprises determining a conversation flow, wherein the conversation flow defines an order between conversation elements, wherein the conversation elements comprise at least a question element and an action element, wherein the action element is associated with automation process.

Optionally, the conversation elements comprise at least one of: a message element and a condition element.

Optionally, the conversation elements comprise a second action element associated with a second automation process, whereby the natural language interface is configured to selectively invoke either the automation process or the second automation process based on interaction with the user.

Optionally, the natural language interface is associated with a plurality of conversations, wherein the plurality of conversations comprise the conversation; wherein each of the plurality of conversations is associated with one or more terms, wherein the natural language interface is configured to select a conversation from the plurality of conversations based on a user intent matching the one or more terms, wherein the user intent is determined based on interaction of the user with the natural language interface.

Optionally, the natural language interface is implemented by a third-party messaging service, wherein the natural language interface is configured to generate and provide the user with a link, wherein interaction with the link is configured to cause execution of the automation process.

Optionally, the link comprises a conversation identifier of a conversation between the user and the natural language interface, wherein the one or more values are configured to be stored in a database by the natural language interface and retrieved, using the conversation identifier, by a client device executing the automation process.

Optionally, the link comprises the one or more values, thereby providing the one or more values to the automation process.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 5A-5E show schematic illustrations of user interfaces, in accordance with the disclosed subject matter;

DETAILED DESCRIPTION

Figure 1:
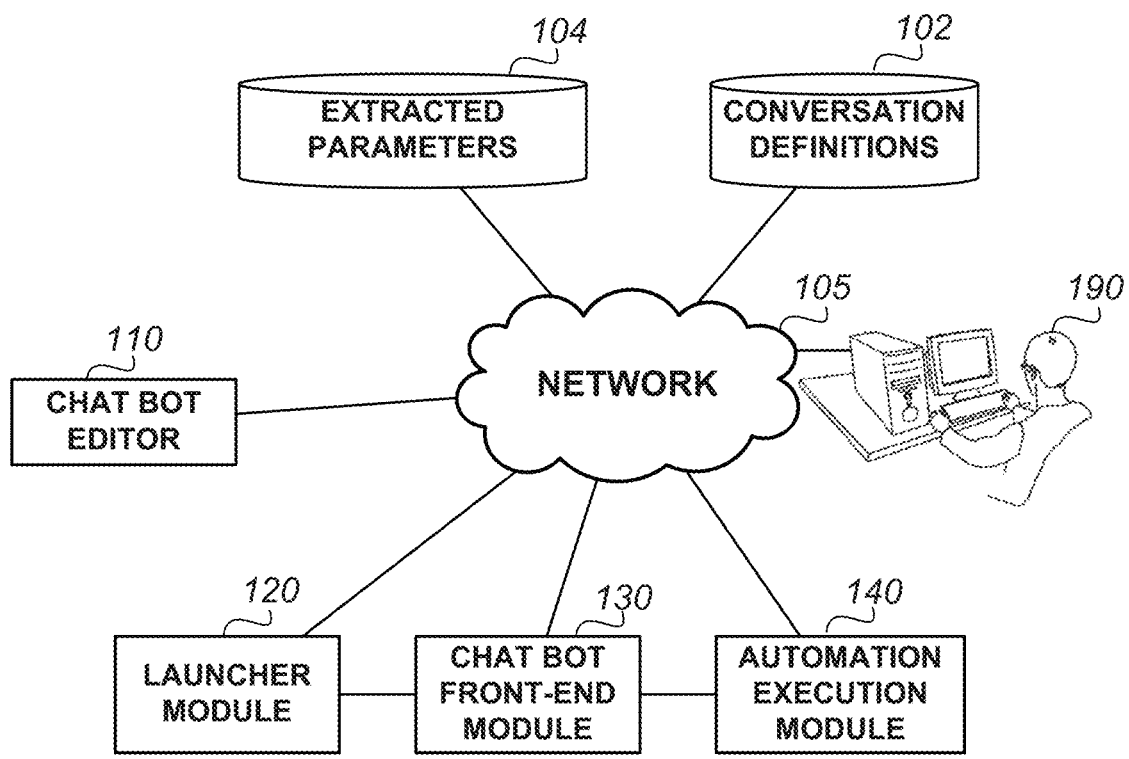
FIG. 1 shows an illustration of an environment, in accordance with some exemplary embodiments of the disclosed subject matter.

One technical problem dealt with by the disclosed subject matter is to provide for a user-friendly manner of defining functionality of chat bots. In particular, defining automation processes to be invoked by chat bots, either dedicated chat bots, such as implemented on a target system where the functionality is invoked, or even using third-party services, such as FACEBOOK MESSENGER™ are the communication platform for the chat bot service, which later invokes the automation process itself on the target system.

The chat bot may be a service that simplifies the end-user experience by collecting data from him and executing a predefined automation flow on the target system. The chat bot may implement a natural language interface, such as a text-based conversation, an oral conversation, or the like. The target system, generally referred to as the computer program, may be a website, a web-based system, a native mobile application (e.g., executed in a protected sandbox), a desktop application (e.g., executed in a process of a non-sandbox-based operating system), or the like. The target system may have a user interface, such as a Graphical User Interface (GUI), that the user may utilize in order to activate the functionalities of the target system.

As an example, if the user wishes to buy stocks on his bank account, he can use the website of the bank. Alternatively, the user may converse with a chat bot that is provided on the bank's website that is capable of asking her all the relevant information for filling the online stock purchase form and then run a predefined automation on top of the bank's website.

As yet another example, a third-party messaging service may be used to converse with a chat bot service. For example, SLAKC™ and TELEGRAM™ allow defining chat bot services as users in the chat service. Users can communicate with such non-human users in the same manner they communicate with other human users. For example, the user may chat with a chat bot named "HR Bot" who may provide Human Resources (HR)-related functionality.

It may be desired to enable defining the chat bots without the need of using dedicated APIs, programming languages, or the like. It may be desired that non-programmers may be able to define the automations that are invoked by the chat bots.

In some cases, adoption of new software may be a challenge to companies. Enterprises may use many different software tools for different purposes, such as HR, Customer Relation Management (CRM), Finance, Task Management, Project planning, or the like. Integration of a new system into an organization may be a challenge as it may require migrating large amounts of employees to new platforms, requiring that the users be trained in using the new system. A chat bot, on the other hand, may abstract away the actual system. Instead of relying on the user's familiarity with the system, the automation process may be in charge of the actual use of the system. The chat bot may simply extract the user's intention, identify the relevant action to be performed, and extract relevant information to be used as part of the automation process.

Another technical problem may be to enable defining automation processes in a manner that enables them to be implemented even if changes are performed to the underlying platform. For example, it may be desired that the automation process will continue working even in the face of layout modifications of the front-end of the program or website. In some cases, it may be desired to be able to identify elements selected during the definition of the automation process during execution thereof. The identification may be a non-trivial task if no unique identifier exists, as may be the case in many instances. Still, it may be desired to be able to identify such element correctly so as to apply the actions defined by the automation process.

One technical solution provided by the disclosed subject matter may be to use a natural language interface to receive input from the user, and based thereon, select an automation process to be executed. The automation process may be executed in a manner that manipulates the GUI of the target system, in a similar manner to the manner in which the user operates. As a result, definition of the automation process may be defined by non-programmers.

Defining the automation process based on performing actions in the GUI enables the automation process to perform any functionality that the user can perform, without relying on dedicated APIs and without requiring any line of code. The parameters of the conversation, as well as the flow of the automation process, may be defined using a point and click editor, or other user interface that can be used by any non-programmer users.

In some cases, if the target system is replaced, the same chat bot conversation may be used to gather the relevant information and the automation process that is invoked may be replaced. The underlying system may be abstracted away and the user may use the simple and convenient chat bot service as the only user interface.

Additionally or alternatively, different functionalities may be implemented and there may be no limit to what the chat bot can invoke, except for the limitations of the target system's own capabilities. A novice user may define in a simple manner the parameters of the conversation that the chat bot implements, and the automation process that would be executed based thereon. Using this seemingly simple techniques, a fast and efficient manner of providing chat bot functionalities is enabled.

In some exemplary embodiments, the chat bot may be implemented on a different system than the target system itself, such as a third-party messaging service. As a result, it may be desired to enable third-party messaging service to invoke the automation process in a simple manner and without relying on coding or on dedicated APIs. In some exemplary embodiments, the chat bot service may generate a link, such as a web link (e.g., a link to a website), a deeplink to a mobile application (e.g., waze://link to the WAZE™ mobile application), a link to a local desktop agent (e.g., walkme://link to the WALKME™ desktop agent), or the like. The link may be presented to the user in the messaging service and the user may click the link. In response to the link being clicked, the target system may be opened and the automation process may be executed.

In some exemplary embodiments, the chat bot may collect information to be used as part of the automation process, such as values to be inputted in input fields, selections to be made in the GUI of the target system, or the like. The information may be provided to the automation process via the link. In some cases, the link may comprise a query string indicating a conversation identifier. The conversation identifier may be a unique identifier of the chat bot session with the user. Before generating the link, the information gathered by the chat bot may be stored in a database with a record whose key is the conversation identifier. After the link is traversed, the conversation identifier is obtained from the query string, and the record is retrieved from the database using the conversation identifier. The collected information itself may be used by the client device when executing the automation process. Additionally or alternatively, the link may comprise the values of the parameters themselves explicitly in the link, enabling to avoid using a database to indirectly pass the information and instead pass it directly via the link.

In some exemplary embodiments, a chat bot service may be associated with different conversation flows. Each conversation flow may be associated with one or more automation processes that can be invoked. A non-programmer user may define the association therebetween and define when each conversation flow is selected, and in which conditions, each automation process is invoked.

An automation process may be a dynamically adaptable tutorial, such as described in U.S. Pat. No. 9,922,008, issued Mar. 20, 2018, entitled "Calling Scripts Based Tutorials", which is hereby incorporated by reference in its entirety for all purposes without giving rise to disavowment. The automation process may define a sequence of steps to be performed. In some exemplary embodiments, some steps may be associated with control flow of the sequence, such as a branching step. Additionally or alternatively, some steps may be associated with performing an action on a GUI element, also referred to as widget. Additionally or alternatively, some steps may be associated with a condition that is based on content of a GUI element.

In some exemplary embodiments, there may be a unique identifier for the widget. For example, a unique id for each element, A Cascading Style Sheet (CSS) selector in a web application, a path to a mobile element, or the like. Selection may be implemented using such unique identifier.

In some exemplary embodiments, there may not be any unique identifier for the widget. For example, the widget may be a button, having a text label "SET", a color parameter, a length parameter, a height parameter, an associated URL that is activated upon clicking thereon, or the like. None of the parameters may be unique to the widget itself. Still, it may be desired to provide for an identification manner of a widget. Additionally or alternatively, the widget may be modified in the GUI, such as its color may be changed, its text may be modified, it may be enlarged or shrinked and the URL may be switched.

In some exemplary embodiments, the identification may be performed in a probabilistic manner. Each widget of the same target type appearing in the relevant screen of the GUI may be examined. Each of the parameters used for identifying the widget-of-interest is compared to the parameter of the examined widget and a similarity score may be computed. The examined widget having the highest similarity score may be determined to be the widget-of-interest. In some exemplary embodiments, in case the highest similarity score is below a predetermined threshold, it may be determined that the widget-of-interest was not located. It is noted that the parameters used for identification of the widget-of-interest may be a subset of the available parameters thereof. Additionally or alternatively, existing parameters in the examined widget that are not part of the parameters of widget-of-interest may reduce the similarity score. Consider, for example, a button widget which does not have a URL to be followed upon click. A button widget that does comprise such URL is less likely to be the same widget-of-interest than another widget that does not have a URL. Additionally or alternatively, the parameters may comprise relative parameters indicating relations to other widgets, such as encapsulated within another element, located in a relative location to another widget, or the like. As the overall layout may expect to remain similar in different version of the target system, such relative parameters may be useful as a hint to indicate whether the examined widget is indeed the widget-of-interest. The relative parameters may refer to other elements, who may be also be identified in a probabilistic manner themselves. Additionally or alternatively, the other elements may be identified using a unique identifier, or using another method.

One technical effect of the disclosed subject matter may be to provide abstraction of the way users, such as employees in an organization and clients of an enterprise, use different platforms and simplify complicated processes for them with a unified, and simple, conversational-based user interface.

Another technical effect may be to provide a chat bot designing process that does not require coding or using designated API. This may allow to bypass the requirement of having the target system expose an API for each potential functionality. Instead, the GUI itself, which already exists in the target system, is used as the API-substitute. Exposing an API may be time-consuming task in some cases, but in many cases it may not be feasible as the target system may be owned by a third-party who may not wish to expose an API and who may not wish to allow external automation.

Yet another technical effect may be to avoid security issues. With API calls, there may be potential security issues, if the API is manipulated. Instead, the disclosed subject matter uses the GUI itself, and the actions may be performed behalf of a logged-in user, under her authority. No additional security issues are created due to the use of the disclosed subject matter, as opposed to potential vulnerabilities that may be introduced when an API is published and made available.

Yet another technical effect may be enabling abstraction of the interface of the target system. Modifications to the target system's interface may be transparent to the automation process, which may continue to function as before, due to its dynamic capabilities. Additionally or alternatively, even extensive changes in the UI and even replacing the target system altogether may be handled quickly and simply using the disclosed subject matter by modifying the automation process accordingly and adjusting the chat bot to invoke the modified automation process instead of the original one. The conversation itself may still follow the same flow and the user may be unaware of the extensive modifications to the underlying target system.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1 showing a computerized environment in accordance with some exemplary embodiments of the disclosed subject matter.

A Chat Bot Editor 110. Editor 110 may enable a non-programmer user (not shown) to define a flow of conversation for a chat bot. The user may define which questions the bot would ask, which remarks it will make, flow control operations that may be based on evaluated conditions, such as branching operations, or the like. Additionally or alternatively, the user may define for a conversation flow which automation process is invoked thereby and which parameters are passed thereto. Additionally or alternatively, the user may define that a conversation is associated with multiple automation processes, one of which may be selected based on the interaction with the user. Additionally or alternatively, Editor 110 may define several different conversation for a single chat bot (e.g., HR Bot). The bot may be defined to select the correct conversation to follow based on user input, such as explicit selection, implicit identified intent, or the like.

In some exemplary embodiments, Editor 110 may be configured to store the definitions of the conversation in a database, such as Conversation Definitions 102. Conversation Definitions 102 can be accessed at runtime when the chat bot service is being executed.

Launcher Module 120 may be configured to provide a launcher widget in the target system. For example, a bot-icon may be presented in a corner of the screen of the GUI. Pressing on the bot-icon may launch the Chat Bot Front-End Module 130.

Chat Bot Front-End Module 130 may be configured to enable a User 190 to interact with a chat bot. User 190 may converse with the chat bot using natural language, such as using written text in a messenger-like UI, using oral conversation such as by providing oral instructions that may be translated to text using speech-to-text methods, or the like. Chat Bot Front-End Module 130 may be a front-end of the chat bot that may be implemented by a dialog processor service (not shown) that may be executed, for example, by a cloud-based platform. In some exemplary embodiments, the dialog processor service may be a microservice. The dialog processor service may access Conversation Definitions 102 to determine the flow of conversation, to determine which question to ask the user, what to do with the provided answer, match values to parameters, or the like.

In some exemplary embodiments, Chat Bot Front-End Module 130 may be a front-end of a third-party communication service that enables integration of a chat bot service, such as using a non-human user representing the chat bot.

Upon a determination of an automation process to be invoked, as may be determined by the dialog processor service based on the Conversation Definitions 102 of the executed conversation, an Automation Execution Module 140 may be invoked. Automation Execution Module 140 may be configured to execute, on the client-side, the automation process. In some cases, the automation process may be a dynamically adaptable tutorial that is invoked. Additionally or alternatively, the automation process may be a dynamically adaptable process that is not a tutorial per se, as the process may not require that each step be shown and explained to the user. In some cases, the process may be performed automatically or semi-automatically. For example, consider a vacation request from an HR bot. The process may be performed automatically to prepare the vacation request by filling a relevant online form. The automation process may request that the user validate the content of the form before its submission, and hence it may require some user assistance.

In some exemplary embodiments, Automation Execution Module 140 may utilize client-side code for website target systems. For example, a JavaScript library running on the website itself and executed by the browser may be utilized. The JavaScript library may be embedded in the code of the website. Additionally or alternatively, the JavaScript library may be imported into the code of the website. Additionally or alternatively, the JavaScript library may be injected to the HTML code using a browser extension on the fly, to provide a solution that need not cooperation of the owner of the website. The client-side code (e.g., JavaScript library) may have access to read and write the entire HTML code of each web page. Thus, the automation may be able to find elements in the HTML, check their values and manipulate them. The automation may also change the page's URL and create new elements on the page (for example: popup balloons).

In some exemplary embodiments, Automation Execution Module 140 may utilize a native library which runs in the host application in case of mobile applications. Mobile applications may be executed on a sandboxed-based operating system, such as iOS™ or ANDROID™, where each application is executed in a separate sandbox. A Software Development Kit (SDK) of the native library can be compiled with the host application if the owner of the host application cooperates. Additionally or alternatively, the SDK may be injected from outside, obliviating the need cooperation of the owner of the application. In such a case, the cooperation of the User 190 may be required, such as by installing a program for injecting the SDK to the host application. As the SDK is injected to the host application, the automation may access the UI elements of the application and this is able to find elements, check their values and manipulate them. New elements may also be created, as needed, on the fly.

In some exemplary embodiments, Automation Execution Module 140 may execute automation process on a desktop application that is executed on a non-sandboxed operating system, such as WINDOWS™ or LINUX™. An agent may be installed on the user device. The agent may access other applications, including their UI elements, manipulate such elements and create new elements.

One or more of the above-mentioned components may be connected to a Network 105, such as intranet, Local Area Network (LAN), the Internet, or the like.

Figure 2A:
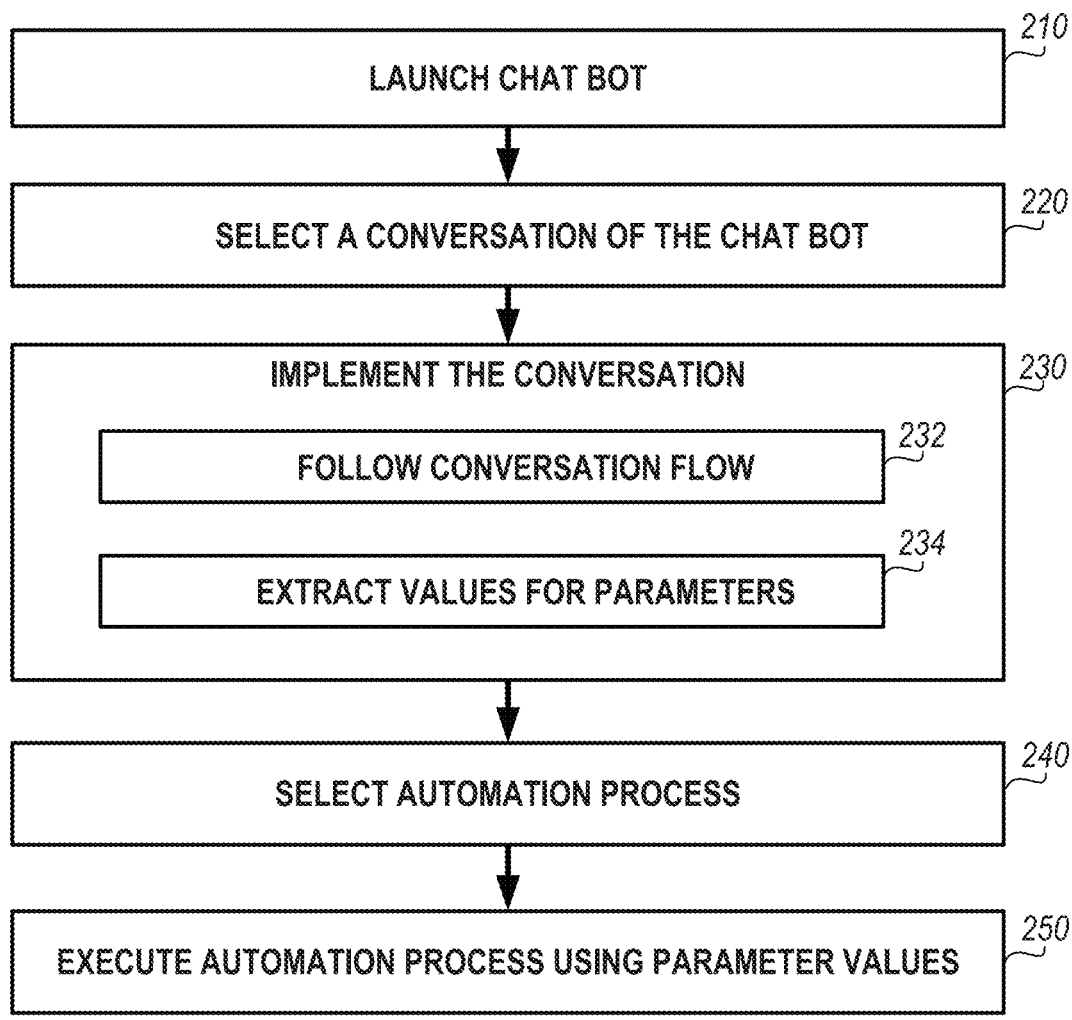
FIGS. 2A-2C show flowcharts of methods, in accordance with some exemplary embodiments of the disclosed subject matter.

Referring now to FIG. 2A showing a flowchart of a method, in accordance with some exemplary embodiments of the disclosed subject matter.

On Step 210, a chat bot is launched. The chat bot may be launched in response to a user clicking on a launch icon, in response to a user command, in response to a user clicking on a physical button, in response to a vocal command (e.g., "OK Siri", "Hey Google"), or the like. In some exemplary embodiments, the user may launch a third-party communication service, such as WHATSAPP™, TELEGRAM™, SLACK™, or the like, and select to converse with a non-human user, representing a chat bot.

On Step 220, a conversation of the chat bot is selected. The conversation may be selected based on explicit selection by the user, based on implicit selection inferred from the user's intent, or the like. The chat bot may be associated with a plurality of potential conversations, defined in a definitions database, such as 102 of FIG. 1. Based on processing of the user's interaction with the chat bot, such as using Natural Language Processing (NLP) techniques, it may be determined which conversation is the most likely conversation and such a conversation may be suggested to the user for confirmation.

On Step 230, the conversation may be implemented. The chat bot service may execute the conversation flow by following the flow defined for the conversation (232). The flow may define announcements that the chat bot service would provide to the user. The announcements may appear as part of a conversation that the chat bot provides, either in written or vocal communication, depending on the modality of the chat bot. The announcements may be fixed and predetermined. Additionally or alternatively, the announcements may be parameterized and be modified based on previous answers by the user, previous messages provided by the user, based on user-related data, contextual information, or the like. The flow may define conditions for evaluation and branching instructions or other control flow instructions that rely on the evaluated value. The flow may define questions configured to extract information from the human user (234). The questions may define a name of a parameter to which the information would be assigned and a type and/or a domain thereof (e.g., text, text matching a predetermined pattern, an integer, an integer within a range, or the like). The values of the parameters may be utilized for setting values of parameters in a parameterized automation process, thereby adjusting the parameterized automation process based on the answers of the user. The adjustment may comprise causing the automation process to input user-defined values to input texts, select different elements, set different conditions, or the like.

On Step 240, an automation process may be selected. The automation process may be selected based on the flow of the conversation. In some exemplary embodiments, a conversation may be associated with several automation processes that are selected based on the user's interaction with the chat bot. Additionally or alternatively, the conversation may be associated with a single conversation that is selected upon reaching the end of the flow of the conversation.

On Step 250, the automation process may be executed. In some exemplary embodiments, the automation process may be a parameterized automation process that is executed using the values of the parameters obtained during the conversation session (e.g., Step 234). The automation process may be executed on the client device. In some exemplary embodiments, the user may a-priori install a computer program product on her client device, such as a desktop agent, a browser extension, or the like, to enable execution of automation processes for target programs and systems that do provide direct support for the disclosed subject matter. Additionally or alternatively, in case of a target program that is supported by the disclosed subject matter, such as a website already having embedded therein the relevant client-side code, no installation of an additional client-side program may be required.

The automation process may be defined by a user of an editor, such as system operator. The definitions of the automation process may be stored in a database and retrieved on the client-side for execution. The automation may be a flow that comprises steps in a predefined order. The flow may comprise control flow steps, such as branching steps that depend on conditions. After a step is executed, a succeeding step in the flow may be executed.

In some exemplary embodiments, the following actions can be defined in the editor and will then cause the corresponding steps to occur in an automation:

A split step may comprise a parameter of type "Rules". Upon execution of the split step, the parameter of the steps may be evaluated. If the rule is evaluated to true, a true branch is traversed to reach to a next step (e.g. "then step"). If the rule is evaluated to false, a false branch is traversed to reach to a different step (e.g., "else step).

A redirect to a URL step may comprise a String parameter named URL and a Boolean parameter named "Don't redirect if URL is identical". If the "Don't redirect if URL is identical" parameter is false or if the current URL of the browser does not equal the URL parameter, the browser is redirected to the URL parameter.

Clicking on screen elements step may comprise an element description of the element-of-interest. The element-of-interest may be identified in the GUI, such as based on a unique identifier, based on a probabilistic method, or the like. The automation process interacts with the element-of-interest and simulates a click action thereon. As an example, the element-of-interest may be a clickable object, a button, or the like.

Hovering on screen elements step may comprise an element-of-interest. The element-of-interest may be identified in the GUI, such as based on a unique identifier, based on a probabilistic method, or the like. The automation process interacts with the element-of-interest and simulates a mouse hover event over the element-of-interest. As an example, the element-of-interest may be a menu element, an element having a tooltip, or the like.

Focusing on screen elements step may comprise an element-of-interest. The element-of-interest may be identified in the GUI, such as based on a unique identifier, based on a probabilistic method, or the like. The automation process interacts with the element-of-interest and simulates an element focus event for the element-of-interest. For example, the element-of-interest may be a text input field which may be manipulated to receive focus, enabling the inputting of texts thereto.

Select list value of on-screen elements step may comprise an element-of-interest and a String value. The element-of-interest may be identified in the GUI, such as based on a unique identifier, based on a probabilistic method, or the like. The automation process interacts with the element-of-interest and simulates a selection of the value from the list defined in the element-of-interest.

Filling an input field step may comprise an element-of-interest, a String text, a parameter name, or the like. The value to be inputted to the element-of-interest can be a fixed value (the String text parameter). Additionally or alternatively, the value may be retrieved from a parameter, whose value is set during the conversation. The name of the parameter may be provided as a parameter to the step (e.g., parameter name). The element-of-interest may be identified in the GUI, such as based on a unique identifier, based on a probabilistic method, or the like. The automation process interacts with the element-of-interest and simulates a user filling input to the element-of-interest, either a fixed value or a value of the parameter.

Prompting the user step. The automation process may prompt the user, such as using a popup, a balloon, a tooltip, or the like. As an example, if the user is required to enter her password, this step may be used. The step may comprise a String variable named "prompt text" providing the content of the prompt itself, a parameter defining a type of prompt, or the like. In some exemplary embodiments, the step may comprise an element-to-bound which may be used as an anchor point to which the prompt is tied. The element-to-bound may be identified in the GUI, such as based on a unique identifier, based on a probabilistic method, or the like.

Wait for a predefined time step may comprise an integer variable named "seconds". The step may be executed by starting a timer for the number of seconds defined in the step. After the time elapses, the automation process continues execution.

Wait for a condition step may comprise a wait condition provided in the form of a variable of type "Rules". For example, a wait step may be defined to wait for an on-screen element to appear.

Show a message step may be a step for presenting a message to the user. The message may be used for indicating, for example, success of the automation. A message content may be defined for the message step.

Variables of type "Rules" may comprise one or more Boolean statements that are connected using logical operators, such as OR, AND, XOR, IFF, or the like. The disclosed subject matter may support a plurality of statements. Non-limiting examples are described: an on screen element exists, does not exist, visible, hidden, or the like; a statement regarding a text label of an on screen element (e.g., String conditions such as contains, length, or the like); a statement regarding a text of the current URL (e.g., String conditions such as contains, length, substring, etc.); checking values of in-app variables; checking an in-app storage value (e.g., cookies, etc.); checking browser type; checking operating system type; checking current date/time; or the like.

Figure 2B:
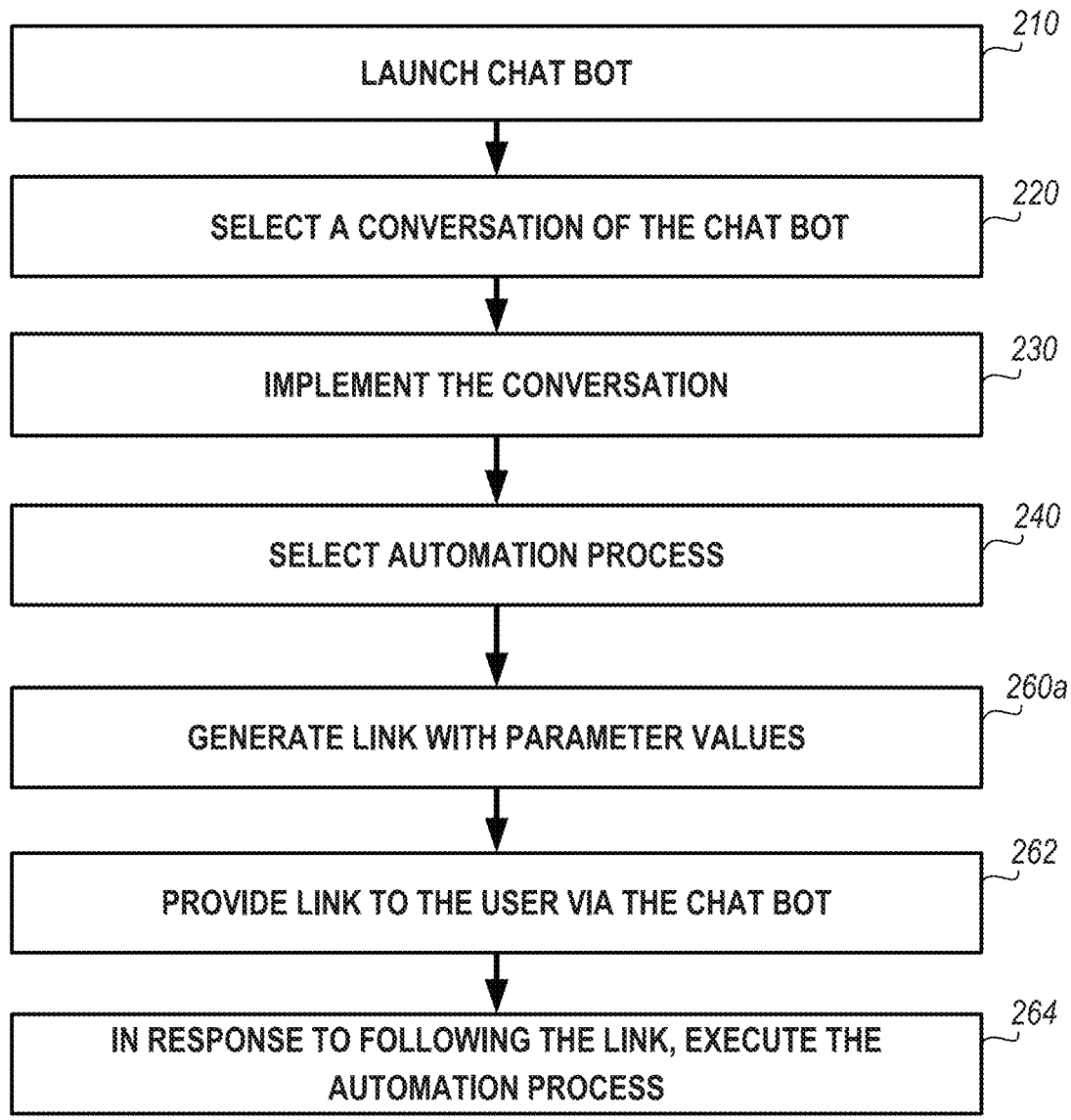

Referring now to FIG. 2B showing a flowchart of a method, in accordance with some exemplary embodiments of the disclosed subject matter.

In FIG. 2B, a chat bot implemented using a third-party platform is utilized. The chat bot conversation is performed in the user interface of the platform, which may not have a configurable interface, let alone one that does not require programming and using of APIs, to the target system.

On Step 260a, after the automation process to be executed is selected (240), a link is generated. The link comprises all the information needed for the automation process. For example, if the automation process is a parameterized automation process, the link may comprise the values of the parameters. In some exemplary embodiments, the link may comprise a query string indicating the values of each parameter of the parameterized automation process. Additionally or alternatively, the link may be defined to invoke a GET HTTP request, a POST HTTP request, or the like, to pass the values of the parameters to the invoked location. As an example, a link for an automation process in the mobile application WAZE™ may be: waze://?automationFlowId=123&param1=abc&param2=def, defining the values of two parameters (param1, param2).

On Step 262, the link is provided to the user via the chat bot session. As an example, the chat bot may provide a message stating: "Click here and I'll do what you asked: [URL]", where URL is replaced with the generated link.

On Step 264, after the user clicked on the link, the automation process may be executed. In case of a parameterized automation process, the values of the parameters may be retrieved from the link.

In some exemplary embodiments, the invocation of the automation process in a desktop application may comprise a link in Uniform Resource Identifier (URI) scheme to the local desktop agent may be provided. After the link is traversed, the local desktop agent may launch the target desktop application. If the agent determines that the target desktop application is already operating, it may avoid re-launching it.

Figure 2C:
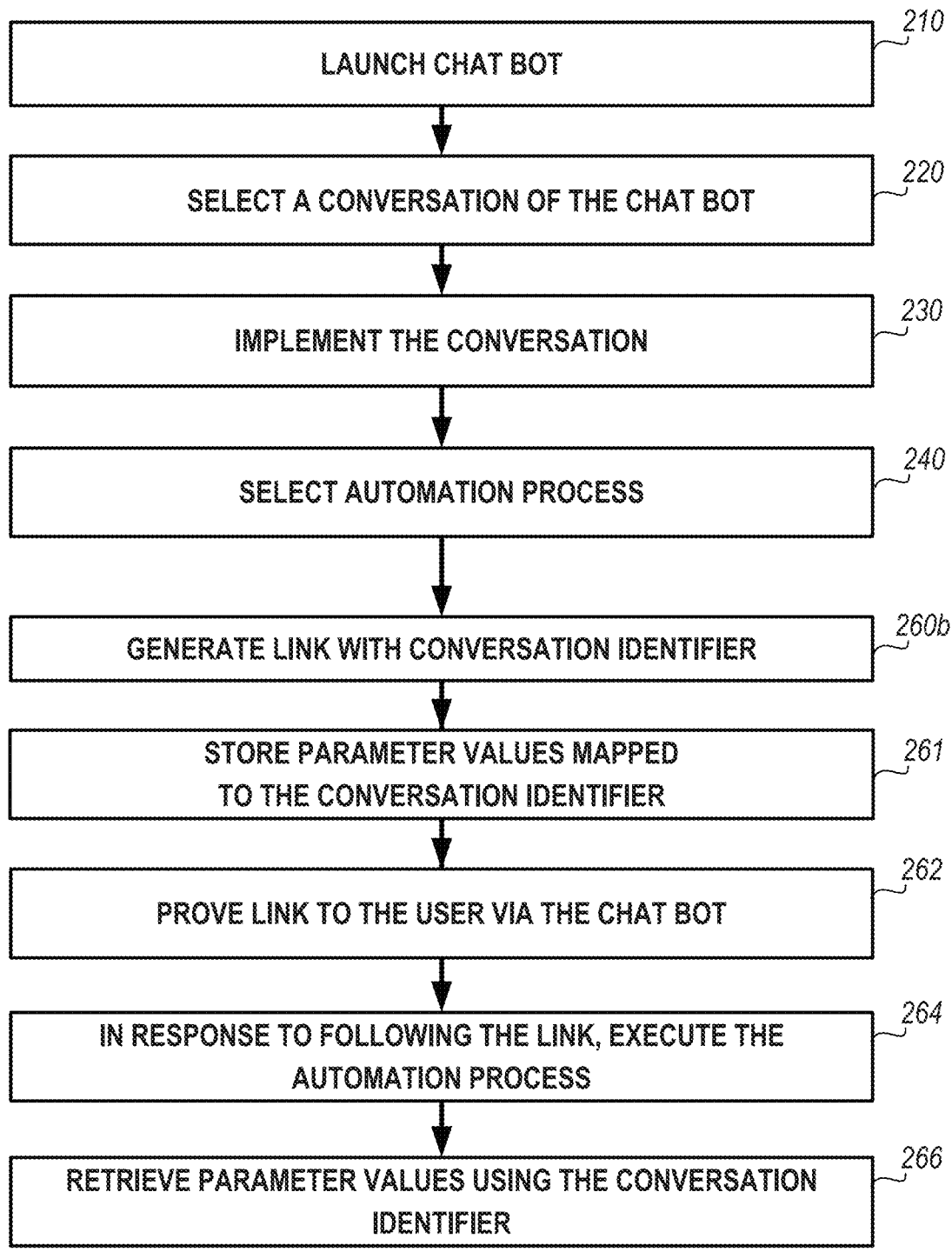

Referring now to FIG. 2C showing a flowchart of a method, in accordance with some exemplary embodiments of the disclosed subject matter.

On Step 260b, a link with a conversation identifier may be generated. Similarly to the link of Step 260a, the link provides the values of the parameters. However, instead of explicitly providing the values in the link, a unique conversation session identifier is allocated and used to identify the conversation session. Consider again the example of the WAZE™ mobile application, the link may be: waze://?conversationResultId=123, wherein the conversationResultId is the conversation session identifier.

On Step 261, the values of the parameters, as determined during the implementation of the conversation based on the user's responses (Step 230), are stored in a database accessible from the target system. The parameters are stored in a record retrievable using the conversation session identifier (e.g., conversationResultId).

On Step 266, the parameters values may be retrieved from the record using the conversation session identifier. In some exemplary embodiments, after retrieval thereof, the record may be deleted and the unique session identifier may be released to be reused for other sessions. Additionally or alternatively, the client device may store in its local storage the information retrieved from the server.

Figure 3:
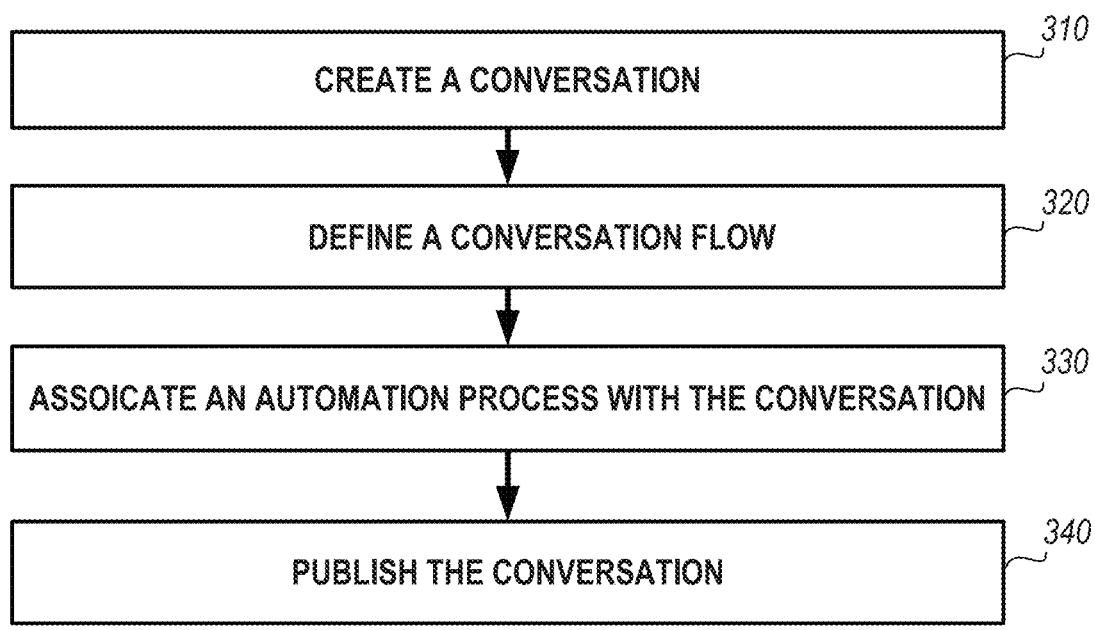
FIG. 3 shows a flowchart of a method, in accordance with some exemplary embodiments of the disclosed subject matter.

Referring now to FIG. 3 showing a flowchart of a method, in accordance with some exemplary embodiments of the disclosed subject matter.

On Step 310, a new conversation is created. The new conversation is to be defined by the administrator user. Additionally or alternatively, the conversation may be an existing conversation that is being updated. In some exemplary embodiments, the conversation may have a name, keywords useful for matching user's response to the conversation, or the like.

On Step 320, a conversation flow may be defined. The conversation flow may define the announcements of the chat bot, the questions the chat bot asks, the parameters that the chat bot asks for and attempts to retrieve from the user's responses, which may be provided in natural language, the control flow conditions on the conversation flow and the like.

On Step 330, one or more automation processes may be associated with the conversation. The user may define, for example, using a click-and-point GUI, which automation process would be invoked and when, with respect to the conversation flow. Conversation flows having branch operations may be associated with more than a single automation process. Additionally or alternatively, a plurality of automation processes may be performed sequentially (either immediately one after the other, or with intermediate questions therebetween).

On Step 340, the conversation may be published and made available to be implemented by a chat bot service. In some exemplary embodiments, the publication may assign the conversation to a specific bot. For example, HR Bot may be assigned several conversations that are different from those of a CRM Bot.

Figure 4A:
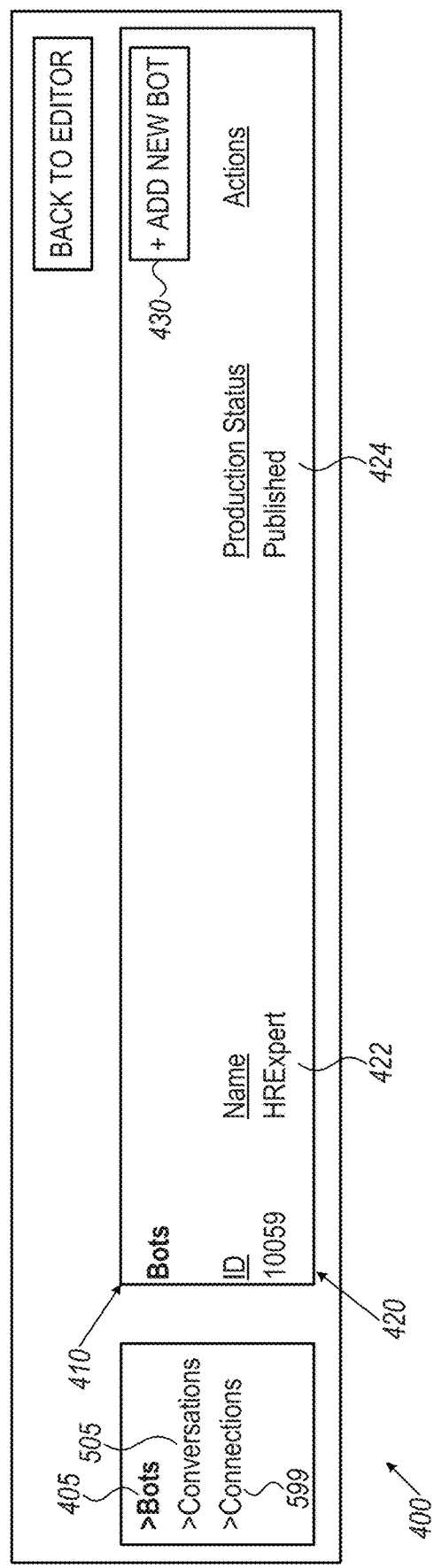
FIGS. 4A-4B show schematic illustrations of user interfaces, in accordance with the disclosed subject matter.

Referring now to FIG. 4A showing a schematic illustration of a user interface, in accordance with the disclosed subject matter.

Screen 400 exemplifies a bot editor GUI. Bots 405 is selected and in Bots Pane 410, all defined bots are listed. Bot 420 is named HRExpert (422), has an assigned identifier and is already active (Published Status 424). Bot 420 may be edited, modified, or made unpublished. Additionally or alternatively, a new bot may be defined using the Add Button 430.

A published bot may be accessible via a launcher defined to be able to launch it. In some exemplary embodiments, the publication is implemented by updating a database to cause the launcher to be able to launch the bot. Additionally or alternatively, publication through third-party platforms may include creation of a non-human user and assigning conversation therewith to be processed by a chat bot conversation microprocess that is configured to access a database to determine parameters of the conversations of the bot. The publication may include updating the databases accordingly. In some exemplary embodiments, a publication of a bot may comprise publishing all (previously unpublished) conversations used by the bot.

Figure 4B:
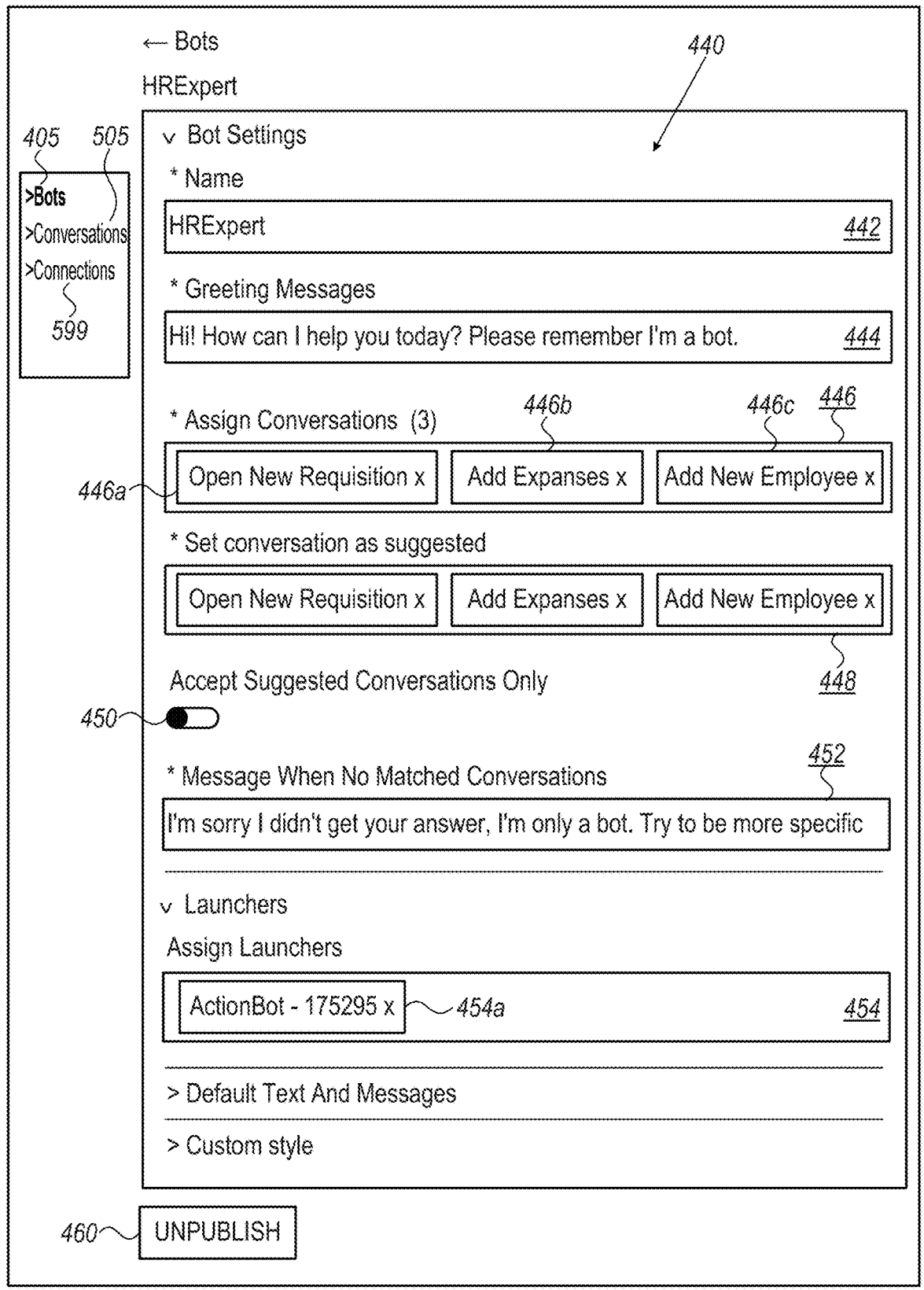

Referring now to FIG. 4B showing a schematic illustration of a user interface, in accordance with the disclosed subject matter.

In Bot Details Editor 440, the details of Bot 420 of FIG. 4A are shown. Name 442 may be modified to a user-defined name. A Greeting Message 444 of Bot 420 may also be defined. A set of Conversations 446 that Bot 420 can implemented are selected. The user may add or remove conversations. Currently, Conversations 446 comprise three different conversations: Open New Requisition (446a), Add Expanses (446b), and Add New Employee (446c). In some cases, Bot 420 may indicate, upon activation, suggested conversations, and such conversations are indicated in List 448. Additionally or alternatively, Toggle 450 may be turned on to indicate that the conversations are only selected from a list and are not inferred from the user's intent as determined from conversation in natural language. An Error Message 452 is defined in case no conversation can be matched.

In some exemplary embodiments, a list of Launchers 454, such as Launcher 454a, indicate launchers that are defined to launch Bot 420. Additionally or alternatively, Launchers 454 may also include a launcher representing a non-human-user in a platform, such as a SLACK™ user representing the HR Bot, Bot 420.

Modifications to the bot may be saved or discarded. In some cases, the user may decide to make a bot unavailable for use of the users, using Unpublish Button 460.

Figure 5A:
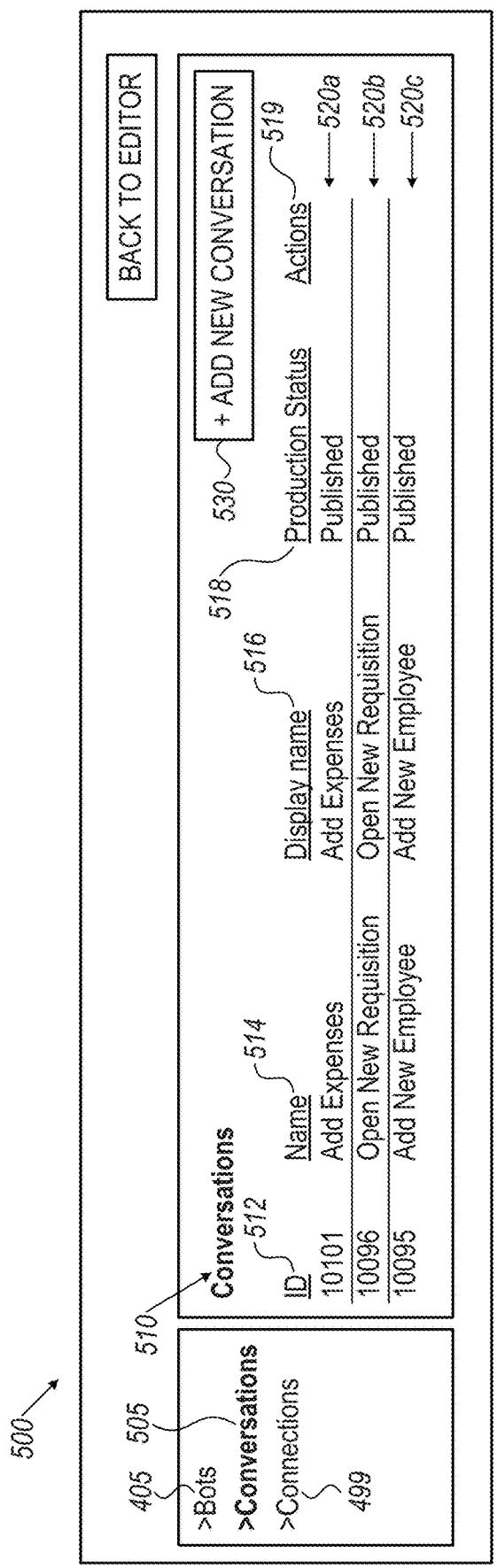

Referring now to FIG. 5A showing a schematic illustration of a user interface, in accordance with the disclosed subject matter.

Screen 500 exemplifies a conversation editor GUI, after Conversations widget 505 is selected. Conversations Pane 510 lists existing conversations (520a, 520b, 520c), indicating for each their identifier, name, display name, production status (512, 514, 516, 518). In some exemplary embodiments, actions of each conversation may be listed under an Actions Column 519. Each conversation may be edited, modified, made unpublished, or the like. Additionally, or alternatively, a new conversation may be defined using the Add Button 530.

Conversations 520a, 520b, 520c are available through Bot 420, as is illustrated in Conversations 446 in FIG. 4B. However, some conversations may be made available by other bots. Additionally or alternatively, the same conversation may be made available by several different bots.

A conversation that is made published may be updated in a database that provides the information of the conversation for implementation by bots that are determined to be able to perform said conversation.

Figure 5B:
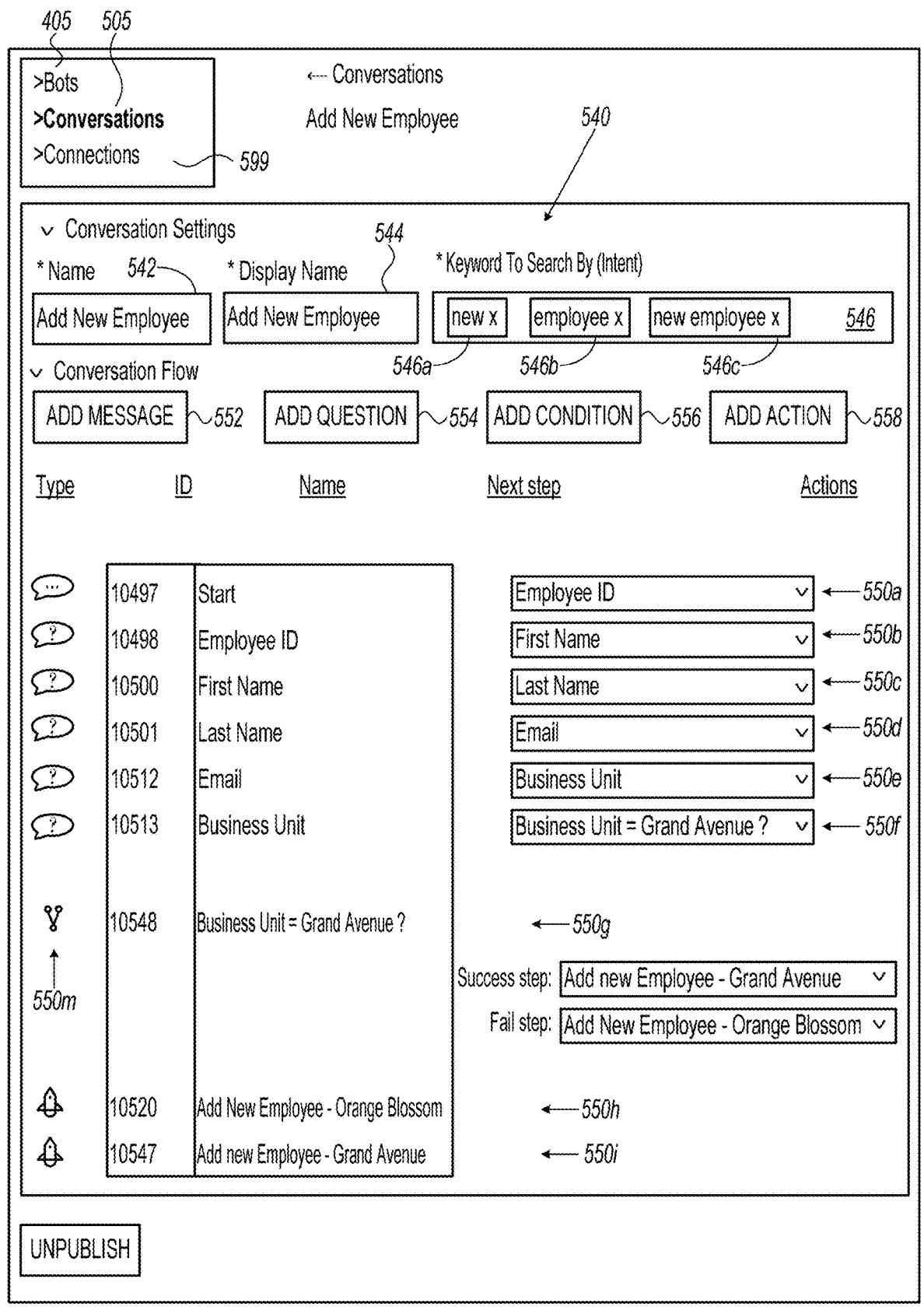

Referring now to FIG. 5B showing a schematic illustration of a user interface, in accordance with the disclosed subject matter.

In Conversation Details Editor 540, the details of Conversation 520c of FIG. 5A are shown. Name 542 and Display Name 544 may be modified to user-defined names. Keywords Field 546 lists keywords that may be used to match the conversation to the user. In some exemplary embodiments, the user's intent may be extracted from her input, that is provided in natural language. Matching the terms, directly or indirectly, to the terms in Keywords Field 546 may indicate an intent of the user, which may be used to select Conversation 420c for implementation. In the illustrated example, the terms are "new", "employee" and "new employee" (546a, 546b, 546c).

In some exemplary embodiments, a conversation flow may be defined by the user, using the GUI and without requiring coding capabilities or API invocations. The user may add new steps to Conversation 420c using Buttons 552, 554, 556, 558. Add Message Button 552 may be configured to add a message step, in which a message to be provided by the chat bot to the user is defined. The definition may be explicit (e.g., fixed text). Additionally, or alternatively, the definition may provide leeway for the chat bot to personalize and implement based on the user's information and the context of the conversation. Add Question Button 554 may be configured to add a question step, in which the chat bot may attempt to retrieve information from the user. The question step may define the type of input to be gathered and a name of a parameter for referring to the user-provided value thereof. Add Condition Button 556 may be configured to add a condition step, in which a condition is evaluated and two alternative flows are selected based thereon. The user may define the condition, as well as the selected next steps for each possibility. Add Action Button 558 may be configured to add an action step, in which an automation process is executed. The user may define how to execute a parameterized automation process and may match the parameters provided during the conversation with the parameters to be provided to the automation process. In some cases, the user may also define how environment variables, user-associated data, or other available data sources not gathered by the natural language interface of the chat bot, may be used as parameters of the parameterized automation process.

Step 550*a* may be a message step, in which the bot acknowledges that the conversation commences and tells the user that the bot would assist her in adding a new employee to the system. The step indicates a next step, which may be selected from a dropdown list of the steps already defined for Conversation 520*c*.

Step 550*b* may be a question step, in which the bot attempt to obtain an employee identifier of the new employee. Similarly, Steps 550*c*, 550*d*, 550*e*, 550*f* are questions steps in which the name of the employee, email address and his business unit are obtained from the user.

Step 550*g*, which may be defined as the step following Step 550*f*, may be a condition step. The condition step may define a condition to be evaluated and based thereon the flow could continue in different paths. In case the condition is true, a success-next step is used (defined as Step 550*i* in the illustrated example). In case the condition is evaluated to false, a fail-next step is followed (defined in the illustrated example as Step 550*h*).

Steps 550*h* and 550*i* are action steps in which an automation process is executed. In the illustrated example, the conversation could end in an execution of one of two automation processes. However, it is noted that a conversation may be configured to end in a specific (single) automation process. Additionally or alternatively, in some cases, a conversation may execute a plurality of automation processes in sequence, one after the other. In such a case, after a first automation process is executed, a second phase of questions may be implemented before executing the second automation process. In some embodiments, the second automation process may be executed directly after the first automation process finishes, and without intervening steps in between.

Figure 5C:
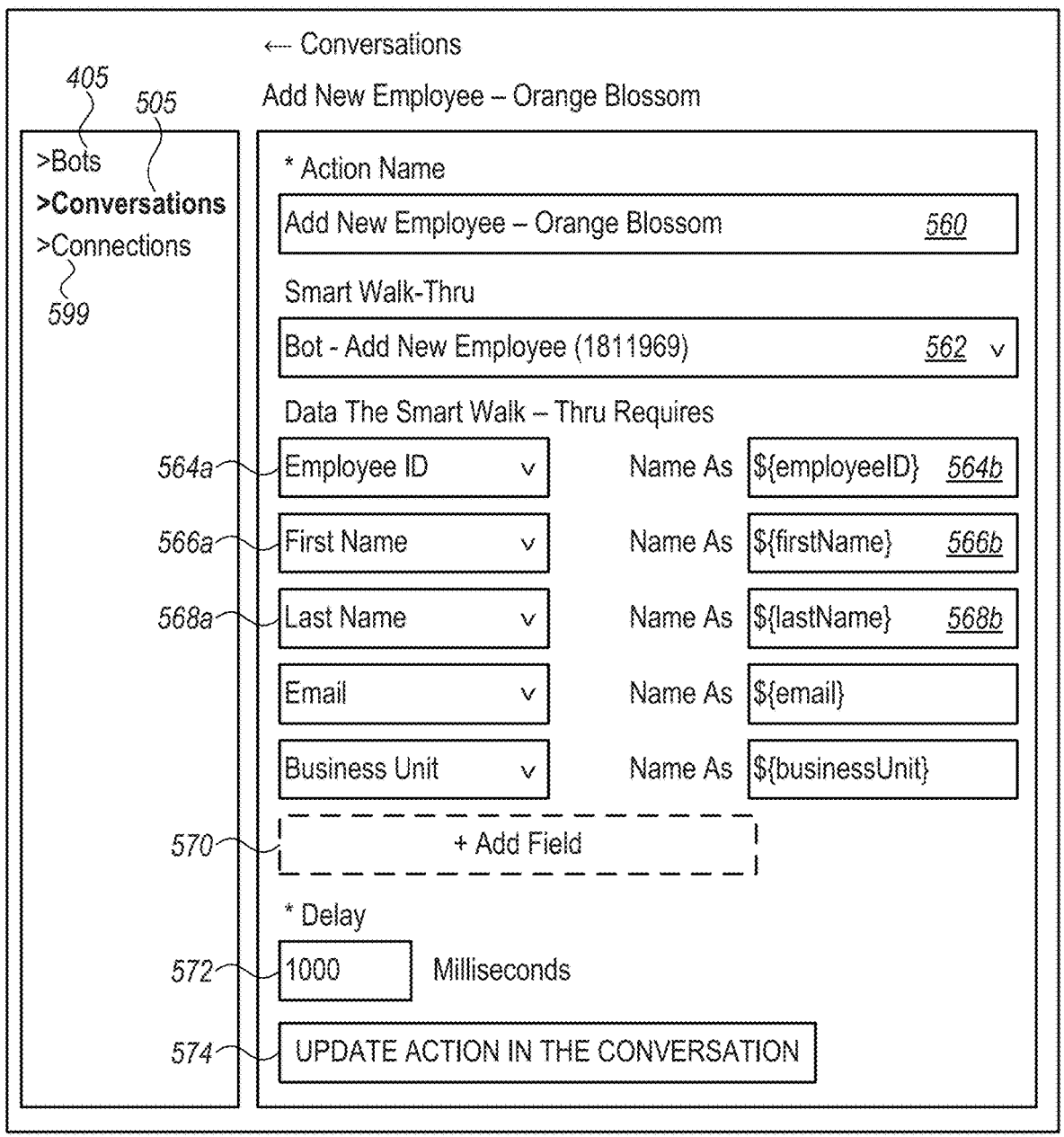

Referring now to FIG. 5C showing a schematic illustration of a user interface, in accordance with the disclosed subject matter. FIG. 5C illustrates an editor of an action step for Action Step 550*h* of FIG. 5B.

The action step editor enables modification to the various parameters of the action step. The name of the action step may be provided in Step Name Field 560. The user may select an automation process in Automation Selector 562. Selector 562 may enable selection from existing automation processes created by the user, or by other users. The automation process may be a dynamically adaptable tutorial, such as described in U.S. Pat. No. 9,922,008, issued Mar. 20, 2018, entitled "Calling Scripts Based Tutorials". The illustrated embodiment refers to the automation processes as Smart Walk-Thru. However, it is noted that the automation process may be completely automatic, a semi-automatic process requiring user's validation, or a walkthrough illustrating for the user how the GUI of the target system can be used to perform the action on a step-by-step basis.

In some exemplary embodiments, the automation process may be a parameterized automation process that can be provided with values to its parameters. In some exemplary embodiments, parameter values may be mandatory. The user may associate parameters gathered by the conversation (e.g., by Question Step 550*b*, 550*c*, 550*d*, 550*e* of FIG. 5B). Additionally, or alternatively, the user may associate parameters available to the chat bot, such as based on the user credentials, environment variables, or the like.

In some exemplary embodiments, Parameter 564*a* may be selected to refer to Employee ID, gathered by Question Step 550*b* of FIG. 5B. Parameter 564*a* may be matched to Automation Parameter 564*b*, ${employeeID}. As another example, Parameter 566*a* may be selected to refer to First Name, gathered by Question Step 550*c* of FIG. 5B. Parameter 566*a* may be matched to Automation Parameter 566*b*, ${firstName}. As yet another example, Parameter 568*a* may be selected to refer to Last Name, gathered by Question Step 550*d* of FIG. 5B. Parameter 568*a* may be matched to Automation Parameter 568*b*, ${lastName}. In some exemplary embodiments, the user may select an automation parameter from a list instead of or in addition to identifying the parameter using its explicit name, as is exemplified by the illustrated embodiment.

Add Field Button 570 may be configured to add a new matching entry for matching an additional parameter to another automation parameter.

In some exemplary embodiments, the user may define Delay 572, indicating a delay after the step is evaluated and before it is executed. This may be useful for ensuring the user is able to see the end of the conversation in the chat bot user interface.

In some exemplary embodiments, Update Button 574 may be configured to update the action based on the user's input in the illustrated screen.

Referring now to FIG. 5D showing a schematic illustration of a user interface, in accordance with the disclosed subject matter. FIG. 5D illustrates an editor of a question step for Question Step 550*b* of FIG. 5B.

The name of the question step, used for the designer of the conversation, may be provided in Step Name Field 580. The text of the question—either fixed or modifiable based on the conversation's context—may be defined in Text Field 584.

In some exemplary embodiments, the type of variable to be obtained may be defined in Type Field 582. In some exemplary embodiments, the type may be an integer, a real number, a string, a date, or the like. The designer may define any type of variable, may define a domain thereof, may define constraints on the allowed values, such as using conditions, domains, excluded patterns, acceptable patterns, or the like.

In some exemplary embodiments, suggested values may be defined using Suggestions List 586. The suggestions may be fixed values, values determined based on the context of the conversation, information associated with the user conversing with the chat bot, or the like.

Additionally or alternatively, Toggle 588 may be turned on to indicate that the values of the answer can only be selected from Suggestions List 586. If Toggle 588 is turned off, other values may be acceptable as well. In some exemplary embodiments, constraints on acceptable values may be defined using conditions, domains, patterns, or the like.

Upon completing of designing the question, Update Question Button 590 may be pressed to save the new definitions.

Figure 5E:
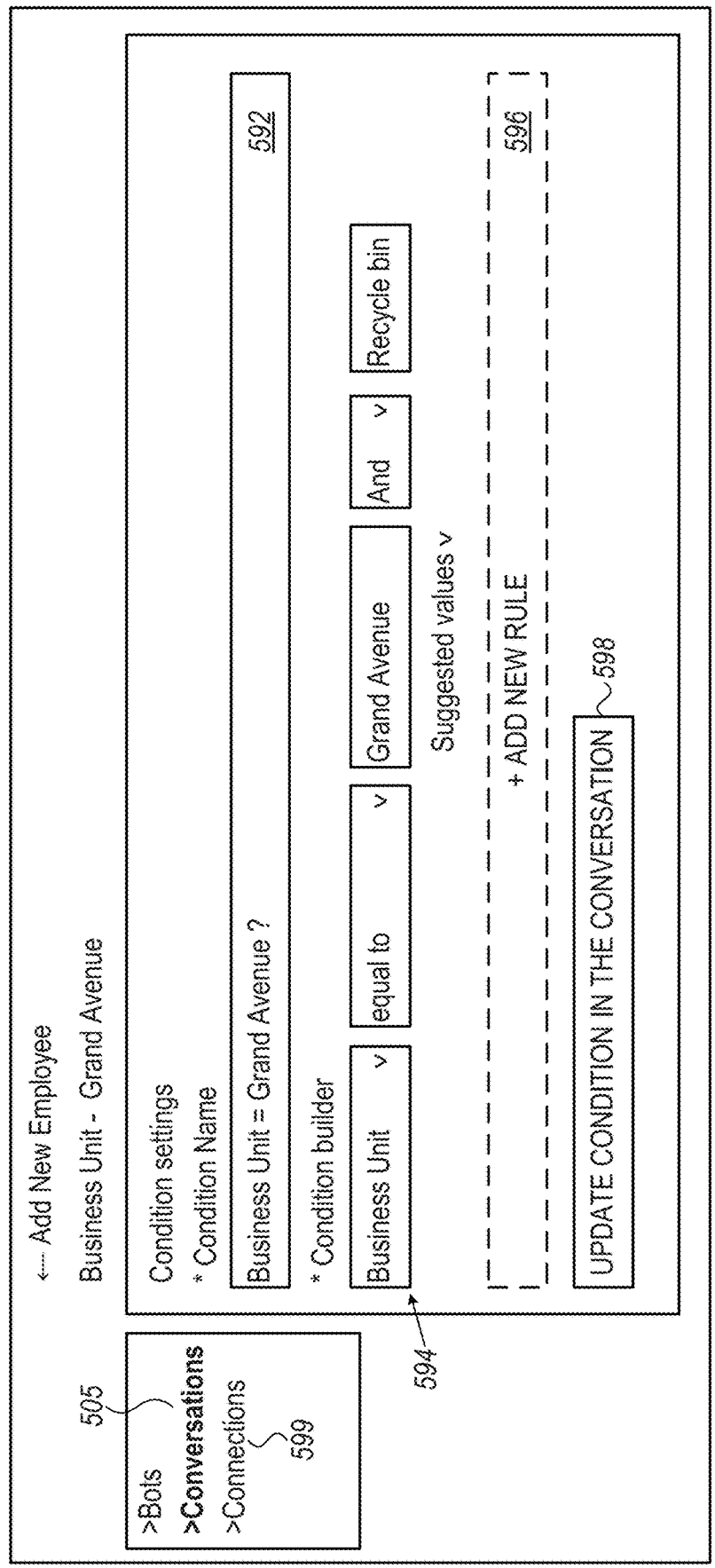

Referring now to FIG. 5E showing a schematic illustration of a user interface, in accordance with the disclosed subject matter. FIG. 5E illustrates an editor of a condition step for Condition Step 550*g* of FIG. 5B.

A Step Name Field 592 may be used to define a name of the condition step by the designer.

Condition Builder 594 pane may enable the designer to construct a complex condition. Atomic rules on parameters, such as values obtained during question steps, may be evaluated. As is exemplified in the figure, a rule which examines the value of Business Unit (extracted in Step S500 is defined. The rule determines whether the value is equal to a fixed value. Additionally or alternatively, other operators can be used instead of "equal to". Additionally or alternatively, the comparison may be with a value of another parameter, a string created based thereon, such as a substring thereof or application of a pattern thereon, or the like. Additional rules may be defined and they may be used to create a complex condition, comprised of logical evaluation of several rules, connected by logical operators such as AND, OR, XOR, NOT, or the like.

Button 598 may be used to update the condition step in the conversation.

In some exemplary embodiments, Connections 599 may be used to retrieve field information from external systems, such as for example, SALESFORCE™. As an example, the SALESFORCE™ platform may comprise a field that contains the list of countries. The chat bot may be enabled to retrieve this list and allow the user to select a value from the list. In some exemplary embodiments, Connections 599 may be used as an alternative to manually creating a copy of the same information in definitions of the conversation of the chat bot. Connections 599 may also enable automatically synchronizing potential values to be inputted via the natural language user interface with values of lists, fields, sets, enumerators, or the like, that are already maintained and potentially updated from time to time, in a third-party platforms already used by the organization.

Figure 6:
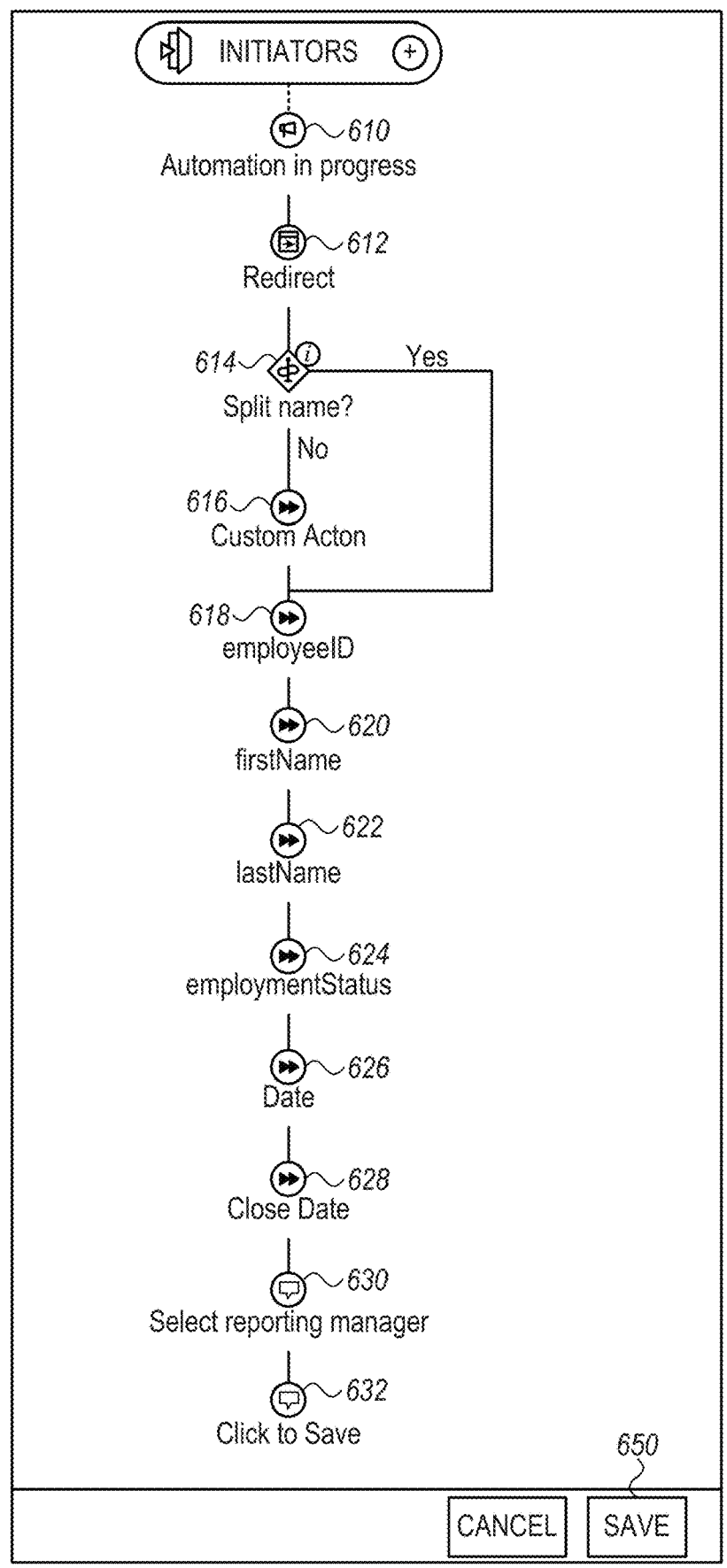
FIG. 6 shows a schematic illustration of a user interface, in accordance with the disclosed subject matter.

Referring now to FIG. 6 showing a schematic illustration of a user interface, in accordance with the disclosed subject matter. FIG. 6 illustrates an editor of an automation process. The automation process may be presented in a similar manner to the manner showing a flow of a conversation, or vise versa. In some exemplary embodiments, the automation process may be defined exclusively for being performed by a bot. Additionally or alternatively, the automation process may be defined also as for tutorial purposes. The same automation process may be modified and be used for dual purposes—walkthrough and bot-operation. Walkthrough messages to the user and call for actions may be matched by automatic rules for performing the action using parameters provided by the chat bot. In some exemplary embodiments, a parameterized automation process may be defined. If a value of a parameter of the automation process is not provided to the entity implementing the automation process, a default callout message may be provided and the user may be asked to provide the information by herself. Hence, the default callout message may be the message used by the tutorial as a call for action for the user.

Step 610 may be a message step, providing a message to the user, such as a message indicating an automation is in progress.

Step 612 may be a page redirect step, where a browser is redirected to a URL.

Step 614 may be a condition step, where a condition is evaluated. Based on the value of the condition, a "YES" branch or a "NO" branch may be taken. As an example, if a "NO" branch is taken, an additional step, Step 616, may be performed to set the state of the browser at a desired state (which was examined in Step 614).

Steps 618, 620, 622 may be used to input employee identifier, first name and last name, respectively. The GUI of the target system, such as the HTML pages used by the website to allow the user to interact with the web-based system, may be manipulated to input the information gathered by the chat bot and associated with automation parameters (e.g., in FIG. 5C).

Steps 624, 626, 628 may input additional information, such as defined automatically based on current context, based on user information, or the like. In some exemplary embodiments, the additional information may be predetermined and fixed. For example, "employmentStatus" may be set of "Employee" as the automation process is that of adding a new employee.

Step 630 may select a reporting manager for the new employee from a list of potential managers. The selection may be made based on user provided input in the conversation, based on automatically determined operation during the automation, or the like.

On Step 632, a save button in the GUI of the target system may be pressed to save the newly inputted information.

Save Button 650 may be pressed to save any updated made to the automation process, such as adding new steps, modifying existing steps, removing steps, changing order in the steps, or the like.

Additional manners of defining and updating an automation process are described in U.S. Pat. No. 9,922,008, issued Mar. 20, 2018, entitled "Calling Scripts Based Tutorials".

Figure 7A:
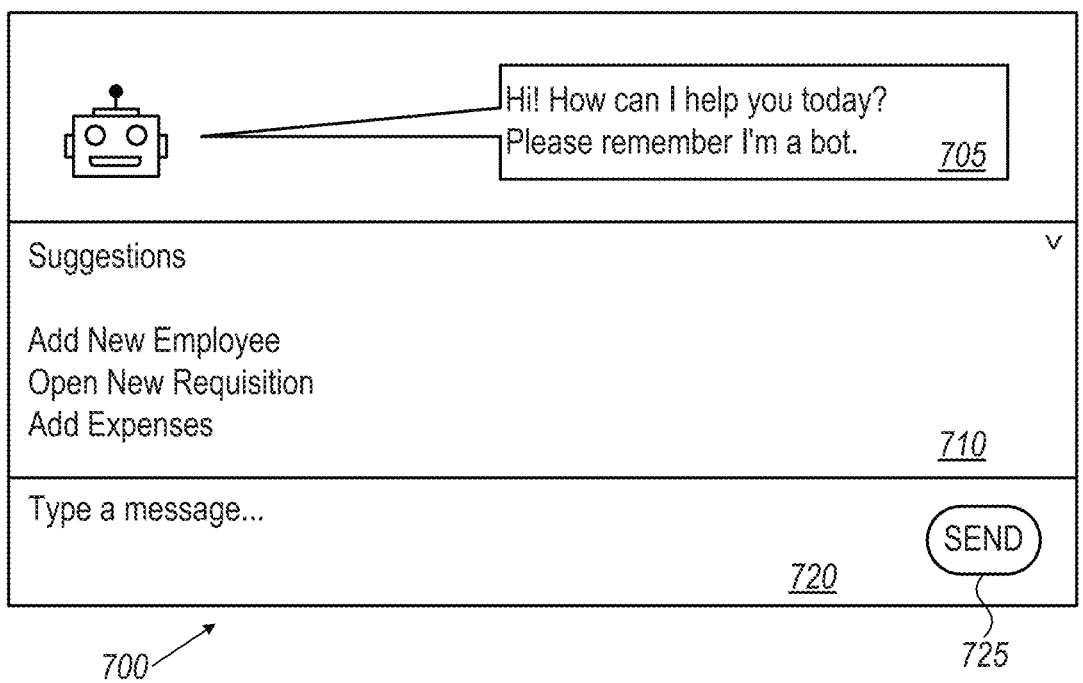
FIGS. 7A-7B show schematic illustrations of user interfaces, in accordance with the disclosed subject matter.

Referring now to FIG. 7A showing a schematic illustration of a user interface, in accordance with the disclosed subject matter.

Screen 700 shows a user interface of the user with a chat bot. The chat bot may have already been launched using a launcher (not shown), such as a button on the button-right corner of the screen. The bot may provide a greeting message upon launching (Message 705). The greeting message may be based on the definition of the chat bot (e.g., 444 of FIG. 4A).

The user may converse with the chat bot using a chat-like interface. A message in free text may be entered into Text Field 720 and provided upon the user pressing enter or the Send Button 725. Additionally or alternatively, speech to text may be employed to analyze speech of the user and generate a text string based thereon. The text string may be entered to Text Field 720 and inputted (e.g., Send Button 725 may be pressed).

Additionally or alternatively, the user may select a conversation from suggested conversations of the bot (710). The user may select the conversation by pressing it or by stating in the Text Field 720 the name of the conversation.

Figure 7B:
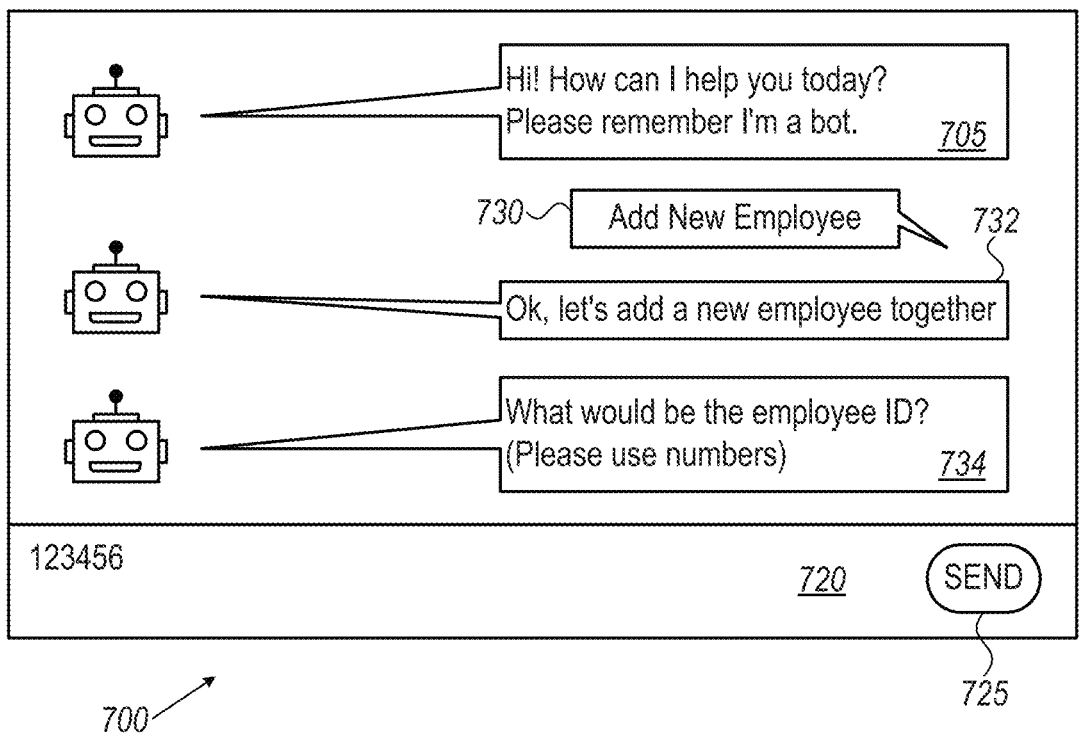

Referring now to FIG. 7B, where the user indicated in Message 730 that she wants to add a new employee. The chat bot may start to implemented the conversation flow of the selected conversation. For example, the flow shown in Editor 540 of FIG. 5B. A Message 732 is shown as an outcome of Step 550a, then the chat bot follows Step 550b and attempts to obtain from the user an employee id (Message 732). The user may reply using Text Field 720 and indicate an identifier (123456).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   using a natural language interface, receiving input from a user as part of a natural language conversation between the natural language interface and the user, wherein the natural language conversation comprises a first natural language input from the user, a natural language feedback on the first natural language input from the natural language interface, and a second natural language input from the user in response to the natural language feedback:
   determining, based on the first and second natural language inputs from the user, an automation process configured to perform an automation of a sequence of interactions with a displayed user interface of a computer program and to simulate user interactions with the displayed user interface of the computer program, wherein the user interface of the computer program is configured to be displayed on a screen, wherein each interaction of the sequence of interactions comprises an action selected from a group consisting of inputting data to the displayed user interface and executing a functionality of the displayed user interface; and
   executing the automation process, wherein said executing comprises utilizing the displayed user interface of the computer program to perform the sequence of interactions.

2. The method of claim 1, wherein the natural language interface is a chat bot service operable to converse with the user in natural language.

3. The method of claim 2, wherein the automation process is a parameterized automation process having a parameter, wherein the chat bot service is configured to prompt the user to provide a value for the parameter, wherein said executing comprises utilizing the value of the parameter.

4. The method of claim 1, wherein the displayed user interface is a Graphical User Interface (GUI) comprising one or more input fields, wherein said utilizing the displayed user interface comprises inputting data received by the natural language interface to the one or more input fields.

5. The method of claim 1, wherein the displayed user interface is a Graphical User Interface (GUI) comprising one or more interactable GUI elements, wherein said utilizing the displayed user interface comprises performing interface interaction with the one or more interactable GUI elements.

6. The method of claim 1, wherein said executing is performed without utilizing an Application Programming Interface (API) of the computer program.

7. The method of claim 1, wherein the sequence of interactions comprises a sequence of steps, wherein each step is selected from a group consisting of:
   a page redirect step;
   a click element step;
   a hovering over element step;
   a set focus to element step;
   a select value from list step;
   a fill input field with value step;
   a prompt user step;
   a time-wait step; and
   a condition-wait step.

8. The method of claim 1, wherein said determining comprises selecting the automation process from a database retaining a plurality of user-defined automation processes; wherein the database is updatable by one or more users via a Graphical User Interface (GUI) capable of defining new automation processes and updating existing automation processes retained therein.

9. The method of claim 1,
   wherein the automation process defines an operation to be performed with respect to an element in the displayed user interface, wherein the automation process identifies the element based on a plurality of parameters of the element;
   wherein said executing the automation process comprises identifying the element in the displayed user interface, wherein said identifying the element comprises computing a similarity score for each element in the displayed user interface using the plurality of parameters of the element, and selecting a selected element having a highest similarity score, wherein the highest similarity score is at least above a predetermined threshold.

10. The method of claim 1 further comprises: generating a link, wherein the link is configured to cause said executing upon clicking thereon, wherein the natural language interface provides the link to the user.

11. The method of claim 10, wherein the link comprises a conversation identifier of the natural language conversation between the user and the natural language interface, wherein the natural language interface is configured to store one or more values of parameters obtained from the user during the natural language conversation in a database in a manner associated with the conversation identifier, wherein said executing comprises retrieving, using the conversation identifier passed by the link, the one or more values of parameters from the database, wherein said utilizing the displayed user interface is performed using the one or more values of the parameters.

12. The method of claim 1, wherein said executing is performed on a client device of the user.

13. The method of claim 1, wherein the natural language interface is a voice-based service, wherein the voice-based service is configured to receive vocal commands from a human user.

14. The method of claim 1, wherein said determining the automation process comprises:
   selecting the sequence of interactions from a plurality of sequences based on the first natural language input; and
   determining a parameter to be used in an interaction of the sequence of interactions based on the second natural language input.

15. The method of claim 1, wherein the displayed user interface of the computer program is displayed prior to the natural language conversation between the natural language interface and the user.

16. The method of claim 1, wherein the displayed user interface of the computer program is presented to the user.

17. The method of claim 1, wherein the displayed user interface of the computer program is presented on a screen of a remote server.

18. The method of claim 1, wherein the displayed user interface of the computer program is a user interface of a web browser, wherein said executing the automation process comprises activating the web browser to cause the displayed user interface to be displayed, wherein the sequence of interactions is performed with respect to the user interface of the web browser.

19. A non-transitory computer readable medium retaining program instructions, which program instructions when read by a processor, cause the processor to perform:
  using a natural language interface, receiving input from a user as part of a natural language conversation between the natural language interface and the user, wherein the natural language conversation comprises a first natural language input from the user, a natural language feedback on the first natural language input from the natural language interface, and a second natural language input from the user in response to the natural language feedback:
  determining, based on the first and second natural language inputs from the user, an automation process configured to perform an automation of a sequence of interactions with a displayed user interface of a computer program and to simulate user interactions with the displayed user interface of the computer program, wherein the user interface of the computer program is configured to be displayed on a screen, wherein each interaction of the sequence of interactions comprises an action selected from a group consisting of inputting data to the displayed user interface and executing a functionality of the displayed user interface; and
  executing the automation process, wherein said executing comprises utilizing the displayed user interface of the computer program to perform the sequence of interactions.

20. The non-transitory computer readable medium of claim 19, wherein the automation process is a parameterized automation process having a parameter, wherein the natural language interface is configured to prompt the user to provide a value for the parameter, wherein said executing comprises utilizing the value of the parameter.

21. The non-transitory computer readable medium of claim 19, wherein the displayed user interface is a Graphical User Interface (GUI) comprising one or more input fields, wherein said utilizing the displayed user interface comprises inputting data received by the natural language interface to the one or more input fields.

22. The non-transitory computer readable medium of claim 19, wherein the displayed user interface is a Graphical User Interface (GUI) comprising one or more interactable GUI elements, wherein said utilizing the displayed user interface comprises performing interface interaction with the one or more interactable GUI elements.

23. The non-transitory computer readable medium of claim 19, wherein said executing is performed without utilizing an Application Programming Interface (API) of the computer program.

24. The non-transitory computer readable medium of claim 19, wherein the program instructions further cause the processor to generate a link, wherein the link is configured to cause said executing upon clicking thereon, wherein the natural language interface provides the link to the user.

25. The non-transitory computer readable medium of claim 19, wherein the displayed user interface of the computer program is displayed prior to the natural language conversation between the natural language interface and the user.

26. The non-transitory computer readable medium of claim 19, wherein the displayed user interface of the computer program is presented to the user.

27. The non-transitory computer readable medium of claim 19, wherein the displayed user interface of the computer program is presented on a screen of a remote server.

28. The non-transitory computer readable medium of claim 19, wherein the displayed user interface of the computer program is a user interface of a web browser, wherein said executing the automation process comprises activating the web browser to cause the displayed user interface to be displayed, wherein the sequence of interactions is performed with respect to the user interface of the web browser.

29. A system comprising: a processor and coupled memory, wherein the processor is configured to perform:
  using a natural language interface, receiving input from a user as part of a natural language conversation between the natural language interface and the user, wherein the natural language conversation comprises a first natural language input from the user, a natural language feedback on the first natural language input from the natural language interface, and a second natural language input from the user in response to the natural language feedback;
  determining, based on the first and second natural language inputs from the user, an automation process configured to perform an automation of a sequence of interactions with a displayed user interface of a computer program and to simulate user interactions with the displayed user interface of the computer program, wherein the user interface of the computer program is configured to be displayed on a screen, wherein each interaction of the sequence of interactions comprises an action selected from a group consisting of inputting data to the displayed user interface and executing a functionality of the displayed user interface; and
  executing the automation process, wherein said executing comprises utilizing the displayed user interface of the computer program to perform the sequence of interactions.

30. The system of claim 29, wherein the displayed user interface of the computer program is displayed prior to the natural language conversation between the natural language interface and the user.

31. The system of claim 29, wherein the displayed user interface of the computer program is presented to the user.

32. The system of claim 29, wherein the displayed user interface of the computer program is presented on a screen of a remote server.

33. The system of claim 29, wherein the displayed user interface of the computer program is a user interface of a web browser, wherein said executing the automation process comprises activating the web browser to cause the displayed user interface to be displayed, wherein the sequence of interactions is performed with respect to the user interface of the web browser.

* * * * *

(12) INTER PARTES REVIEW CERTIFICATE (4010th)

United States Patent
Nahum et al.

(10) Number: US 10,819,664 K1
(45) Certificate Issued: Jul. 9, 2025

(54) CHAT-BASED APPLICATION INTERFACE FOR AUTOMATION

(71) Applicants: Nir Nahum; Shlomi Sasson

(72) Inventors: Nir Nahum; Shlomi Sasson

(73) Assignee: WALKEME LTD.

Trial Number:

IPR2023-01368 filed Aug. 30, 2023

Inter Partes Review Certificate for:

Patent No.: 10,819,664
Issued: Oct. 27, 2020
Appl. No.: 16/358,467
Filed: Mar. 19, 2019

The results of IPR2023-01368 are reflected in this inter partes review certificate under 35 U.S.C. 318(b).

INTER PARTES REVIEW CERTIFICATE
U.S. Patent 10,819,664 K1
Trial No. IPR2023-01368
Certificate Issued Jul. 9, 2025

AS A RESULT OF THE INTER PARTES REVIEW PROCEEDING, IT HAS BEEN DETERMINED THAT:

Claims 9, 14, 15, 18, 25, 28, 30 and 33 are found patentable.

Claims 1-8, 12, 13, 16, 19-23, 26, 29 and 31 are cancelled.

\* \* \* \* \*